(12) United States Patent
Morris et al.

(10) Patent No.: US 7,879,589 B2
(45) Date of Patent: Feb. 1, 2011

(54) MICRO-ELECTRON ACCEPTOR PHOSPHORUS ACCUMULATING ORGANISMS

(75) Inventors: James W. Morris, Standish, ME (US); Jere Northrop, Amherst, NY (US)

(73) Assignee: Bion Technologies, Inc., New York, NY (US)

( * ) Notice: Subject to any disclaimer, the term of this patent is extended or adjusted under 35 U.S.C. 154(b) by 0 days.

(21) Appl. No.: 12/542,122

(22) Filed: Aug. 17, 2009

(65) Prior Publication Data

US 2009/0305386 A1    Dec. 10, 2009

Related U.S. Application Data

(60) Division of application No. 11/592,513, filed on Nov. 3, 2006, now Pat. No. 7,575,685, which is a continuation of application No. 11/106,751, filed on Apr. 15, 2005, now Pat. No. 7,431,839, which is a continuation of application No. 10/600,936, filed on Jun. 20, 2003, now Pat. No. 6,908,495, which is a division of application No. 09/709,171, filed on Nov. 10, 2000, now Pat. No. 6,689,274.

(51) Int. Cl.
    *C02F 3/00* (2006.01)
(52) U.S. Cl. .................. 435/243; 210/906
(58) Field of Classification Search .......... 435/243; 210/906
    See application file for complete search history.

(56) References Cited

U.S. PATENT DOCUMENTS

| | | | |
|---|---|---|---|
| 3,964,998 A | 6/1976 | Laing | |
| 4,179,374 A | 12/1979 | Savage et al. | 210/151 |
| 4,292,328 A | 9/1981 | Coulthard et al. | 426/2 |
| 4,487,697 A | 12/1984 | Böhnke et al. | 210/605 |
| 4,540,666 A | 9/1985 | Nukina et al. | 435/166 |
| 4,721,569 A | 1/1988 | Northrop | 210/607 |
| 4,780,208 A | 10/1988 | Böhnke et al. | 210/605 |
| 5,078,882 A | 1/1992 | Northrop | 210/602 |
| 5,137,636 A * | 8/1992 | Bundgaard | 210/605 |

(Continued)

FOREIGN PATENT DOCUMENTS

AU    712 746 B2    11/1999

(Continued)

OTHER PUBLICATIONS

Johwan Ahn et al., "Characterization of denitrifying phosphate-accumulating organisms cultivated under different electron acceptor conditions using polymerase chain reaction-denaturing gradient gel electrophoresis assay," Water Research, Elsevier, Amsterdam, NL, vol. 36, No. 2, pp. 403-412 (Jan. 2002).

(Continued)

*Primary Examiner*—Chester T Barry
(74) *Attorney, Agent, or Firm*—Kenyon & Kenyon LLP

(57) ABSTRACT

The present invention is directed to a substantially odorless biologically mediated treatment process for solid and liquid organic wastes. The present invention also provides for a novel nutrient rich humus material produced from the biologically mediated treatment process. The bioconversion process of the present invention results from low electron acceptor concentrations and high quantities of microorganisms in a diverse microbial community.

20 Claims, 8 Drawing Sheets

U.S. PATENT DOCUMENTS

| | | | | |
|---|---|---|---|---|
| 5,248,422 | A | 9/1993 | Neu | 210/605 |
| 5,338,452 | A | 8/1994 | Pidaparti | 210/188 |
| 5,447,633 | A | 9/1995 | Matsche et al. | 210/605 |
| 5,472,472 | A | 12/1995 | Northrop | 71/9 |
| 5,506,096 | A | 4/1996 | Helmo | 435/3 |
| 5,538,529 | A | 7/1996 | Northrop | 71/9 |
| 5,543,051 | A * | 8/1996 | Harris | 210/605 |
| 5,601,719 | A | 2/1997 | Hawkins et al. | |
| 5,603,744 | A | 2/1997 | Kuerner | 71/9 |
| 5,667,688 | A * | 9/1997 | Kerrn-Jespersen et al. | 210/605 |
| 5,700,370 | A | 12/1997 | Helmo | 210/94 |
| 5,733,454 | A | 3/1998 | Cummings | 210/603 |
| 5,755,852 | A | 5/1998 | Northrop | 71/9 |
| 5,783,081 | A | 7/1998 | Gaddy | 210/603 |
| 5,906,746 | A | 5/1999 | Helmo et al. | 210/614 |
| 6,013,512 | A | 1/2000 | Turschmid et al. | 435/266 |
| 6,039,873 | A | 3/2000 | Stahler | |
| 6,068,774 | A | 5/2000 | Vandenbergh et al. | 210/611 |
| 6,086,765 | A | 7/2000 | Edwards | 210/605 |
| 6,087,159 | A | 7/2000 | Finn | 435/299.1 |
| 6,106,716 | A | 8/2000 | Berkman | 210/603 |
| 6,190,566 | B1 | 2/2001 | Kolber | 119/447 |
| 6,312,599 | B1 | 11/2001 | Reid | 210/605 |
| 6,350,350 | B1 | 2/2002 | Jensen et al. | 162/141 |
| 6,660,163 | B2 * | 12/2003 | Miklos | 210/605 |
| 6,689,274 | B1 | 2/2004 | Northrop et al. | 210/601 |
| 2004/0007523 | A1 | 1/2004 | Gabon et al. | |
| 2005/0087480 | A1* | 4/2005 | Park et al. | 210/96.1 |
| 2005/0242026 | A1 | 11/2005 | Morris et al. | |

FOREIGN PATENT DOCUMENTS

| | | |
|---|---|---|
| EP | 1 364 915 A | 11/2003 |
| GB | 1245434 | 9/1971 |
| WO | WO 90/10083 | 7/1990 |
| WO | WO 2004/092079 | 10/2004 |

OTHER PUBLICATIONS

American Society of Agricultural Engineers, "Manure production and characteristics," ASAE Standard D384.1, downloaded from http://www.manuremangement.cornell.edu/Docs/ASAEStandard.pdf on Jun. 29, 2007 (6 pages) (Feb. 2003).

Astrid A. Van de Graaf et al., "Autotrophic growth of anaerobic ammonium-oxidizing micro-organisms in a fluidized bed reactor," Microbiology (UK),142:2187-2196 (1996).

Metcalf & Eddy, "Wastewater Engineering—Treatment, Disposal, Reuse" (Third Edition)Tchobanoglous, George, et al., McGraw-Hill (1991), p. 512-518; and p. 726.

Metcalf & Eddy, "Wastewater Engineering—Treatment and Reuse" (4Edition), Tchobanoglous, George et al., McGraw-Hill, Inc. (2003), pp. 623-627.

M. Fuerhacker et al., "Approach for a novel control strategy for simultaneous nitrification/denitrification in activated sludge reactors," Water Research, 34 (9): p. 2499-2506 (Jun. 2000).

C. Collivignarelli et al., "Simultaneous nitrification-denitrification processes inactivated sludge plants: Performance and applicability," Water Science and Technology, 40 (4-5): p. 187-194 (Aug.-Sep. 1999).

Klangduen Pochana et al., "Study of factors affecting simultaneous nitrification and denitrification SND ," Water Science and Technology, 39 (6): p. 61-68 (Mar. 1999).

Hong W. Zhao et al., "Controlling factors for simultaneous nitrification and denitrification in a two-stage intermittent aeration process treating domestic sewage," Water Research, 33 (4): p. 961-970 (Mar. 1998).

Hyungseok Yoo et al., "Nitrogen removal from synthetic wastewater by simultaneous nitrification and denitrification (SND) via nitrite in an intermittently-aerated reactor," Water Research , 33 (1): p. 145-154 (Jan. 1999).

Bent Halling-Sorensen et al., "A model of nitrogen removal from wastewater in a fixed bed reactor using simultaneous nitrification and denitrification (SND)," Ecological Modelling, 87 (1-3): p. 131-141 (1996).

Anders O. Wistrom et al., "Enhanced nutrient removal by limiting dissolved oxygen concentration in a continuously fed, intermittently decanted, activated sludge plant," Environmental Technology, 17 (4): p. 371-380 (1996).

Elisabeth V. Munch et al., "Simultaneous nitrification and denitrification in bench-scale sequencing batch reactors," Water Research, 30 (2): p. 277-284 (1996).

Eberhard Bock et al., "Nitrogen loss caused by denitrifying Nitrosomonas cells using ammonium or hydrogen as electron donors and nitrite as electron acceptor," Archives of Microbiology, 163 (1): p. 16-20 (1995).

Chung-Min Liao et al., "Nitrification/denitrification in an intermittent aeration process for swine wastewater," Journal of Environmental Science and Health Part B Pesticides Foods Contaminants and Agricultural Wastes, 29 (5): p. 1053-1078 (1994).

G. Bortone et al., "Nitrification and denitrification inactivated-sludge plants for pig slurry and wastewater from cheese dairies," Bioresoure Technology, 37 (3): p. 243-252 (1991).

F. Carta et al., "Aerobic purification of dairy wastewater in continuous regime; reactor with support," Process Biochemistry, V34, N6-7 (SEP), p. 613-619 (1999).

F. Beline et al., "Factors affecting nitrogen transformations and related nitrous oxide emission from aerobically treated piggery slurry," Journal of Agricultural Engineering Research, V73, N3 p. 235-243 (Jul. 1999).

K. Yoo et al., "Nitrogen removal from synthetic wastewater by simultaneous nitrification and denitrification (SND) via nitrite in an intermittenly-aerated reactor," Water Research, V33, NI p145-154 (Jan. 1999).

C. Helmer et al., "Simultaneous nitrification/denitrification in an aerobic biofilm system," Water Science and Technology, V37, N4-5, p. 183-187 (1998).

S. Okabe et al., "Relationship between population dynamics of nitrifiers in biofilms and reactor performance at various C:N ratios," Water Research, V30, N7 p. 1563-1572 (Jul. 1996).

Jr Bicudo et al., "Intermittent aeration of pig slurry—farm scale experiments for carbon and nitrogen removal," Water Science and Technology , V32, N12, p. 83-90 (1995).

Y. Watanabe et al., "Simultaneous removal of organic materials and nitrogen by micro-aerobic biofilms," Water Science and Technology V31, N1, p. 195-203 (1995).

I F. Svoboda et al., "Nitrogen removal from pig slurry by nitrification and denitrification," American Society Agricultural Engineers Seventh International Symposium on Agric. & Food Processing Wastes p. 24 (Jun. 18-20, 1995).

H. Bennemann et al., "Simultaneous nitrification and denitrification in a single step unit," Conference Title: DECHEMA biotechnology conferences—Lectures at the 7th DECHEMA annual meeting of biotechnologists, Frankfurt am Main, Germany, p. 1011-1014 (May 30-31, 1989).

J. Dufay et al., "Simultaneous nitrification/denitrification in constructed wetlands," Joint Conference on the Environment, p. 85-90 (Mar. 1988).

K. M. Ho et al., "The importance of simultaneous nitrification-denitrification in Biological Nutrient Removal activated Sludge Systems with low F/M bulking control," Australian Conference on Biological Nutrient Removal from Wastewater, 1994; 2nd p. 365-374 (AWWA) (1995).

H. Hvidtfeldt Rasmussen et al., "Treatment of odorous nitrogen compounds in a bioscrubber comprising simultaneous nitrification and denitrification," Symp. On Biological Waste Gas Cleaning, Heidelberg, Germany, (Mar. 9-11, 1994).

Hao Xiaodi, et al., "Removing nitrate and ammonium from drainage water by simulation of natural biological processes" Water Research v. 32 No. 3 p. 936-943 (Mar. 1998).

P. J. Hirl, "Wastewater treatment with zero dissolved oxygen," 1998 National Conference on Environmental Engineering (Jun. 7-10, 1998).

Harald Horn., "Simultane Nitrifikation and Denitrifikation in einem hetero-/autotrophen Biofilm unter Berucksichtigung der Sauerstoffprofile" (English Abstract Enclosed—Simultaneous nitrification and denitrification in a hetero/autotrophic biofilm in concern to the oxygen gradient GWF (DasGas—und Wasserfach) Wasser—Abwasser (Germany) v 133:6, p. 287-292 (Jun. 1992).

P. Harremoes et al., "Evaluation of Methods for Nitrogen and Phosphorous Control in Sewage Effluents," Journal of the Institute of Water and Environmental Management, Supplementary European Issue, p. 50-61 (Mar. 1992).

USEPA, *Manual: Nitrogen Control* (1993), Office of Research and Development, EPA/625/R-93/010, Washington, DC, p. 86-87, 101-103.

"Anaerobic Digester at Craven Farms," www.energy.state.or.us/biomass/digester/craven.htm downloaded Jun. 20, 2002, last modified Jun. 20, 2002.

Course Syllabus, MB302 (General Microbiology, Oregon State University, Fall 2001, http://www.orst.edu/instruct/mb302/field/Lecture7/Lecutre7.htm l downloaded Jun. 20, 2002, date of last modification (unknown).

Janssen, P.M.J., "Biological Phosphorous Removal, Manual for Design and Operation," IWA Publishing (2002), pp. 15-20.

Yinguang Chen et al., "Comparison between acclimated and unacclimated biomass affecting anaerobic-aerobic transformations in the biological removal of phosphorus," Process Biochemistry, vol. 40, No. 2, pp. 723-732 (Feb. 2005).

T. Shoji et al., "Quantitative estimation of the role of denitrifying phosphate accumulating organisms in nutrient removal," Water Science and Technology, vol. 47, No. 11, pp. 23-29 (2003).

Raymond J. Zeng et al., "Identification and comparison of aerobic and denitrifying polyphosphate-accumulating organisms," Biotechnology and Bioengineering, vol. 83, No. 2, pp. 140-148 (Jul. 20, 2003).

De-Bashan, L. E. et al., "Recent advances in removing phosphorus from wastewater and its future use as fertilizer (1997-2003)", Water Research (2004) vol. 38:19, pp. 4222-4246.

Hu, Z. et al., "Anoxic growth of phosphate-accumulating organisms (PAOs) in biological nutrient removal activated sludge systems" Water Research (2002), vol. 36:19, pp. 4927-4937.

* cited by examiner

MICRO-ELECTRON ACCEPTOR PHOSPHORUS ACCUMULATING ORGANISMS

CROSS-REFERENCE TO RELATED APPLICATIONS

The present application is a divisional application of U.S. Ser. No. 11/592,513 filed Nov. 3, 2006, issuing on Aug. 18, 2009 as U.S. Pat. No. 7,575,685, which is a continuation-in-part of U.S. patent application Ser. No. 11/106,751 filed on Apr. 15, 2005, now U.S. Pat. No. 7,431,839, which is a continuation-in-part of U.S. application Ser. No. 10/600,936, filed on Jun. 20, 2003, now U.S. Pat. No. 6,908,495, which is a divisional application of and claims priority to U.S. patent application Ser. No. 09/709,171 filed on Nov. 10, 2000, now U.S. Pat. No. 6,689,274, which are incorporated by reference in their entireties. U.S. application Ser. No. 10/600,936 filed on Jun. 20, 2003, now U.S. Pat. No. 6,908,495 and U.S. patent application Ser. No. 09/709,171 filed on Nov. 10, 2000, now U.S. Pat. No. 6,689,274 are each expressly incorporated herein in its entirety by reference thereto.

The present invention relates to a novel process for the biologically mediated treatment of solid and liquid organic wastes, particularly animal farm wastes, including the removal of nutrients from such wastes, such as, for example, phosphorus and nitrogen.

BACKGROUND OF THE INVENTION

Everyday, organic waste streams are created that need to be treated in some form or manner before they are disposed of. For example, organic waste streams in conventional municipal waste and wastewater plants, food manufacturing facilities, industrial factories, and animal farms are typically treated either physically, chemically, and/or biologically before combining the effluent(s) with a water body, land applying the effluent(s), or disposing of the effluent(s) in an alternative manner, such as by removal from the site for further treatment elsewhere.

Organic waste treatment technologies have progressed significantly in recent years due, in part, to increased public awareness, lobbying, legislation and regulatory oversight. In some instances, treatment technologies have been developed upon the realization that entirely new and useful products could be created from the wastes thereby generating new business opportunities for technology innovators. Often times, new or improved technologies are created for purely economic reasons.

Presently, most treatment technologies for organic wastes typically include some form of biological treatment wherein biological organisms stabilize organic matter and remove soluble and/or nonsettleable colloidal solids to reduce the content of microbial substrates (nutrients such as phosphorus, sulfur and particularly nitrogen and other organic biodegradable materials as measured by the total biochemical oxygen demand (BOD) test). The microbial substrates, particularly if left untreated, are known to pollute surface and subsurface water supplies and negatively impact air and soil quality. Suspended growth processes, attached-growth processes and combined suspended and attached growth processes are used for biological treatment of organic wastes to reduce substrate quantities in the treated effluents. Often times, waste streams and the microbial substrates therein are also subjected to additional treatment processes prior to the disposal of process effluents such as, for example, screening, digestion, composting, disinfection, chemical precipitation, and/or phosphorus removal.

With increasing human population density, municipal wastewater treatment facilities, animal farming facilities, and industrial and food processing treatment facilities have come under increasing pressure to upgrade, modify, or supplement their treatment processes to improve the quality of system effluent discharges as well as the air in and around such facilities to further protect the environment, and human and animal health. A particularly persistent problem addressed by the present invention is the treatment of animal excrement containing high concentrations of microbial substrates which, in typical animal treatment systems, not only pollute surface and subsurface water supplies, but also negatively impact air and soil quality. The effluent discharges from these animal treatment systems oftentimes contain undesired amounts of available nitrogen and phosphorus which have been linked to detrimental effects in water bodies such as, for example, accelerated eutrophication and aquatic growths. Further, present treatment alternatives for organic waste streams, such as animal excrement, frequently generate and exacerbate the offensive odors and emissions of atmospheric pollutants.

The input to an organic waste biological treatment process usually contains concentrations of phosphorus and other nutrients such as, for example, nitrogen. This will hold for flowable organic waste streams or for non flowable wastes, such as scrapped fresh manure, which are converted into an aqueous stream by mixing with a recycle stream from a treatment process. For municipal wastewaters, the typical influent phosphorus (P) to nitrogen (N) load ratio (the "P/N Ratio") is about 0.18. Metcalf & Eddy, *Wastewater Engineering—Treatment and Reuse*, $4^{th}$ Ed., Tchobanoglous, George et al., McGraw-Hill, Inc. (2003). P/N Ratios for animal farm wastes are typically about 0.18 (dairy) to 0.30 (swine and layer chickens). ASAE Standard D384.1, 2003. Industrial waste and food industry waste P/N Ratios are less consistent than those for municipal or animal wastes and largely depend on the products and the processes. Some of the nutrients in such organic inputs will be incorporated into the microbial cell mass as a result of the biological treatment process and may be removed from treatment systems as a component of the solids (sometimes referred to as sludge). The portion of the nutrients remaining in the waste stream (whether converted or unconverted by the biological treatment process) will be discharged with the liquid effluent.

In some processes, the amount of a single nutrient can be a limiting factor to the biological treatment process and nearly all of that nutrient is converted and incorporated into the microbial cell mass leaving little, if any, portion of that nutrient in the process liquid effluent. In conventional biological wastewater treatment processes where the BOD and COD concentrations are not limiting, and when the P/N Ratio is appropriately low relative to the requirements of normally growing microbial populations, the vast majority of the phosphorus will be assimilated into biomass and the phosphorus in the liquid effluent will in turn be relatively low. This will generally be true if the P/N Ratio is less than about 0.16 (as long as no significant nitrification and denitrification is occurring in the system in which case nitrogen gas is typically released increasing the P/N Ratio that can be treated), since this is the P/N Ratio commonly found in slowly growing microbial cells. In effect, the phosphorus and nitrogen in the wastewater treatment system is assimilated into microbial cells.

In the low oxygen organic waste biologically mediated conversion system for an organic waste described in U.S. Pat. No. 6,689,274 (Northrop, et al.), in order to accomplish a similar result for biological conversion of phosphorus and nitrogen, the P/N Ratio needs to be somewhat lower than about 0.16 because significant amounts of nitrogen are discharged to atmosphere as dimolecular nitrogen gas and hence is not available for incorporation into microbial cells. Thus, P/N Ratios of about 0.07 or less would normally be required in the organic influent waste stream to achieve equivalent low effluent phosphorus discharges as seen in conventional biological treatment systems. The phosphorus content in the treated effluent depends upon the incorporation of phosphorus into microbial cells and other settleable and/or suspended solids and then separating those cells and solids from that effluent by collecting them as a portion of the harvested humus material generated by the process. Any phosphorus not converted into insoluble and/or particulate form, as well as any insoluble and/or particulate nutrients not collected in the harvested humus material will be discharged in the system effluent. On average, phosphorus removal by biological treatment processes with sludge wasting may range from 10 to 30 percent of the influent amount. Metcalf & Eddy, *Wastewater Engineering, Treatment, Disposal, Reuse*, $3^{rd}$ Ed., Tchobanoglous, George et al., McGraw-Hill, Inc. (1991) at p. 726. According to the process described in U.S. Pat. No. 6,689,274, low effluent discharges of phosphorus would contain less than about 50 percent of the influent phosphorus load (greater than about 50 percent removal). Preferable discharges would contain less than about 20 percent of the influent phosphorus load (greater than about 80 percent removal).

When the influent waste stream to a biological wastewater treatment process contains P/N Ratios which are higher, sometimes substantially higher, than 0.16, the resulting concentration of soluble phosphorus in the effluent stream may be higher than desired and it is sometimes necessary and/or desirable to lower such effluent phosphorus discharges. One method known in the art to try to lower such effluent phosphorus discharges is the addition of an anaerobic zone to an aerobic wastewater biological treatment process. The expected increase in the phosphorus content of the resultant biomass and sludge is supposed to reduce effluent phosphorus discharges. This phosphorus conversion process is generally known as the "Bio-P" process and the conversion mechanism is understood to be as follows:

A community of micro organisms referred to as Phosphorus Accumulating Organisms ("PAOs"), when exposed to alternating aerobic and anaerobic environments, will take up excess amounts of phosphate ions and store them as polyphosphate. When these PAOs encounter anaerobic conditions they will use the energy stored in the polyphosphate, thereby decreasing their polyphosphate stores, and will accumulate acetate or other volatile fatty acids, storing these compounds in polymer form, usually as polyhydroxybuteric acid. When these organisms then encounter aerobic conditions they will oxidize the stored organic polymers and other energy sources using electron acceptors (e.g. oxygen) from the aerobic environment and use the energy to form energy rich polyphosphate. The polyphosphate is stored so that the energy it contains may be used when anaerobic conditions recur, which allows the PAOs to displace other heterotrophic microorganisms that can not take advantage of the stored energy to thrive under anaerobic conditions. This relative energy advantage in the anaerobic environment leads to the dominance of PAOs over other phosphate uptake organisms which utilize oxygen as an electron acceptor. See Janssen, P. M. J., *Biological Phosphorus Removal, Manual for design and operation*, IWA Publishing (2002) at p. 17. When the PAOs use the energy stored in the polyphosphate in the anaerobic sub-zone, soluble phosphorus is released. When the PAOs return to the aerobic zone soluble phosphorus is absorbed and again converted to polyphosphate removing it from the aqueous phase and incorporating it as insoluble or particulate microbial biomass. If this biomass is then removed under aerobic conditions before the anaerobic environment is encountered, the phosphorus is removed from the system. Metcalf & Eddy, *Wastewater Engineering—Treatment and Reuse*, $4^{th}$ Ed., Tchobanoglous, George et al., McGraw-Hill, Inc. (2003) at p. 623-627.

Recently, the Bio-P mechanism has been found to work if the aerobic process is replaced with an anoxic process containing nitrate and/or nitrite instead of molecular oxygen. Janssen, P. M. J., *Biological Phosphorus Removal, Manual for design and operation*, IWA Publishing (2002) at p. 16. However, the efficiency of the process using an anoxic environment instead of an aerobic environment is lower than that obtained when molecular oxygen in an aerobic environment is used. This occurs because it takes energy to extract oxygen from electron acceptors such as nitrate or nitrite and so the net production of usable energy from a substrate must be decreased by this amount (usually by about 40 percent when the electron acceptor is nitrate, see Janssen at pg. 20).

Despite this reduced efficiency, the addition of an anaerobic environment to a nitrate containing anoxic process, and the recycling of the anoxic liquid through the anaerobic environment, allows denitrifying PAOs to have a similar Bio-P selective advantage over normal, non-PAO denitrifiers. However, prior to the Applicants' discovery, this selective advantage was expected to disappear as the concentration of nitrate decreased to low levels because, compared to a normal non-PAO denitrifier, it would become more difficult for the PAO to acquire the additional electron acceptors it needs to generate the extra energy required to build and use the various PAO polymers. Thus, the concentration of nitrate or nitrite is rate limiting for PAO denitrifiers at significantly higher levels than it is for normal non-PAO denitrifiers.

This rate limiting effect from concentrations of nitrate or nitrite is not a problem if other electron acceptors are available in sufficient quantities in the aerobic or anoxic environment. However, in environments with low electron acceptor concentrations, a cell would be less likely to get the additional ions it needs to grow and function compared to a normal denitrifier, and hence would not be competitive with such normal denitrifiers in that environment. The selective advantage which the anaerobic environment provided for PAO's would disappear. As the whole system approaches the conditions of an anaerobic environment (lower and lower concentrations of electron acceptors) the advantage of a separate anaerobic environment would be expected to disappear.

Despite the expectation that low concentrations of nitrate would make anoxic Bio-P ineffective, applicants have surprisingly found that if an anaerobic zone is added to or within the low oxygen organic waste bioconversion system described in U.S. Pat. No. 6,689,274 (Northrop et al.), and if the process liquid is recycled through the system, including the anaerobic zone, a significant transformation occurs whereby more soluble phosphorus is converted into particulate phosphorus. This transformation of soluble phosphorus into particulate form occurs even though the concentrations of molecular oxygen, nitrate, and nitrite are very low.

Even more surprising has been the discovery that once the transformation occurs, whereby more soluble phosphorus is converted into particulate phosphorus in a system which experiences alternating exposure to anaerobic and low electron acceptor environments, this enhanced phosphorus conversion (transforming into particulate form) ability can persist even when the anaerobic environment is subsequently removed from the process.

Thus, applicants have surprisingly discovered that certain populations of PAOs, and especially certain populations of denitrifying PAOs, can continue to accumulate significant levels of particulate phosphorus even when living in environments which have low concentrations of electron accepting substances (such as oxygen, nitrite, nitrate) and that these populations of PAOs maintain this conversion ability whether they function exclusively in low electron acceptor environments or whether they live in environments which vary between anaerobic and low electron acceptor conditions at either a microscopic or macroscopic scale.

In general, denitrifying PAOs are not expected to have a selective advantage to grow in low electron acceptor environments without a physically separated and defined anaerobic environment. However, Applicants have determined that the surprising ability to do so can be induced in a variety of ways that include, but are not limited to: 1. recycling the denitrifying PAOs between anaerobic and low electron acceptor zones containing relatively high phosphorus to nitrogen ratios (greater than about 0.16 and as high as about 0.3 to 0.5) until the phosphorus conversion ability is developed and then removing the anaerobic zone from the system, 2. seeding the low electron acceptor environment described in U.S. Pat. No. 6,689,274 and U.S. application Ser. No. 10/600,936 containing relatively high phosphorus to nitrogen ratios (greater than about 0.16 and as high as about 0.3 to 0.5) with nitrifying and denitrifying PAOs which already are adapted to grow in the low electron acceptor environment without a physically separated and defined anaerobic environment, perhaps from another treatment system or from a PAO production site; and 3. in a system without a physically defined anaerobic environment but with a low electron acceptor environment, through varying low concentrations of electron acceptors in local zones (microenvironments) of a large environment containing relatively high phosphorus to nitrogen ratios (greater than about 0.16 and as high as about 0.3 to 0.5) so that a population of denitrifying PAOs evolves which is tolerant to and will grow in any such low electron acceptor environment as evidenced by particulate phosphorus concentrations.

There is clearly a competitive advantage for denitrifying PAOs which are able to grow exclusively in low electron acceptor environments and which can also grow in environments which have both low electron acceptor zones and anaerobic zones (microenvironments). Incorporation of these populations into organic waste treatment systems with relatively high phosphorus to nitrogen ratios allows such waste streams to be successfully treated within low electron acceptor environments without the necessity of designing, building, and operating additional systems or subsystems with discrete anaerobic environments. Capital investments are decreased, maintenance costs are reduced and land use is minimized.

Applicants have therefore discovered an improved process for the biologically mediated conversion of organic waste and removal of nutrients from the waste. This process operates at low electron acceptor concentrations while maintaining high quantities of diverse populations of microorganisms in the process. The present invention addresses many of the problems associated with municipal, domestic, industrial, food industry, animal husbandry and other organic wastes, by providing an attractive and efficient means to resolve ecological problems associated with the treatment of organic wastes. The present invention addresses the odor emission problem common to organic wastes as well as the problem associated with high nutrient effluent discharge concentrations through the efficient, substantially odorless, biologically mediated conversion of waste excrement materials or a vast array of other organic wastes into stable, economically and/or ecologically beneficial materials.

Thus, it is an object of the present invention to provide an improved process for the efficient, substantially odorless, biological treatment of organic waste.

It is another object of the present invention to provide an improved process for the efficient, substantially odorless, biological treatment of organic waste which converts a substantial portion of the soluble phosphorus into particulate form.

It is another object of the present invention to provide an improved process to create a biologically active, ecologically beneficial, substantially odorless humus material through the biologically mediated conversion of phosphorus containing organic waste, in which most of the phosphorus is captured in the humus material.

It is another object of the present invention to provide an improved process for the efficient, substantially odorless, biologically mediated transformation of organic wastes into suitable materials for recycling to the environment.

It is another object of the present invention to provide an improved process to create a biologically active, ecologically beneficial, substantially odorless humus material through the biologically mediated conversion of organic waste, particularly animal excrement.

It is a still further object of the present invention to create PAOs with the capability of accumulating significant levels of particulate phosphorus even when living in environments which have low concentrations of electron accepting substances (such as oxygen, nitrite, nitrate) with and/or without subjecting the PAOs to discrete anaerobic conditions in a physically defined and separate environment.

It is a still further object of the present invention to provide a process to create a biologically active, and/or nutrient rich, organic soil.

It is a still further object of the present invention to provide a process to create a biologically active, and/or nutrient rich, feed material or supplement.

These and other objects will be apparent from the following description of the invention.

SUMMARY OF THE INVENTION

The present invention relates to a low oxygen, high microorganism mass, biologically mediated organic waste conversion process, the microorganisms in the process, and the product of the process. In the process, organic waste, such as animal excrement, containing concentrations of potentially polluting or environmentally harmful substrates, is biologically treated and stabilized. The process performs simultaneous nitrification and denitrification on organic waste streams and converts soluble phosphorus to particulate form. The present invention also includes the discovery of a unique ecological niche in which PAOs can convert soluble forms of phosphorus to particulate form when living in environments which have low concentrations of electron accepting substances (such as oxygen, nitrite, nitrate) whether they function exclusively in low electron acceptor environments or whether they live in environments which vary between anaerobic and low electron acceptor conditions at either a microscopic or macroscopic scale. Thus, the present invention furthermore relates to a low oxygen, high microorganism mass, biologically mediated organic waste conversion process with increased nutrient conversion. The present invention also includes the ecologically beneficial, nutrient rich, valuable organic humus material created by the processes of the invention.

Applicants have discovered that if specific environmental conditions are maintained in a biological wastewater treatment process, a natural microbial community will evolve that will seek a state of dynamic equilibrium within a plurality of desired ecological niches. Applicants have surprisingly determined that a high mass of microorganisms can be maintained in combination with a low dissolved oxygen concentration resulting in a substantially odorless, efficient biologically mediated conversion of organic waste wherein simultaneous nitrification and denitrification occurs in a low electron acceptor environment, such as, for example, low concentrations of oxygen, nitrate or nitrite, either alone or in any combination thereof. The process provides for simultaneous treatment and stabilization of the organic waste, is substantially odorless and is more efficient than present biological treatment systems.

Applicants have also surprisingly determined that certain unexpected results can be achieved within the low electron acceptor environment of the process when (i) certain environmental conditions are temporarily added to induce certain microorganism abilities; (ii) certain microbial populations having induced abilities are added, and/or (iii) the low concentrations of electron acceptors are varied in local zones of a large environment containing relatively high phosphorus to nitrogen ratios (greater than about 0.16 and as high as about 0.3 to 0.5) to induce certain microorganism abilities. More specifically, the amount of soluble nutrients, such as, for example, phosphorus, in the waste that is converted into particulates can be increased.

Accordingly, Applicants have surprisingly discovered a process to simultaneously treat and stabilize organic waste, which is substantially odorless and more efficient than present biological treatment systems, and which provides efficient biologically mediated conversion of organic waste and nutrients, wherein simultaneous nitrification and denitrification occur in a low electron acceptor environment, such as, for example, low concentrations of oxygen, nitrate or nitrite, either alone or in any combination thereof, without discrete anaerobic conditions in a physically defined and separate environment. The process utilizes (and in some cases, establishes) what shall be referred to hereinafter as micro-electron acceptor PAOs ("MEAPAOs") which function in the low electron acceptor environment of the invention containing high microorganism mass, the MEAPAOs possessing enhanced nutrient uptake or carrying abilities. The presence and continued existence of populations of these MEAPAOs with the capability of converting soluble nutrients into particulate form in the low electron acceptor environment result in unexpected nutrient removal by the overall treatment system.

The resulting humus material of the process has commercial value, is not of unpleasant odor and can be safely maintained in open storage without significant migration of compounds. The process also manages water, which may have been combined with organic waste to optionally provide a nutrient rich aqueous fertilizer, which can be used to irrigate crops, or as a clean, generally low nutrient liquid, that with further processing is potentially suitable for discharge to a water body.

This substantially odorless biologically mediated conversion of organic waste results, in part, from the presence of diverse populations of microorganisms in the treatment process. Although not limited to these specific populations, the low oxygen biologically mediated conversion process of the present invention is believed to be the result of the presence, in significant quantities, of four microbial populations including facultative heterotrophic fermentors, autotrophic nitrifiers, facultative heterotrophic denitrifiers, and autotrophic ammonium denitrifiers, as well as other organisms that coexist in this engineered environment. Each microbial population contributes to the biologically mediated conversion of the organic waste to nitrogen gas ($N_2$), carbon dioxide ($CO_2$), water vapor ($H_2O$), clean water and beneficial soil products (humus) containing nutrients such as phosphorus (P) and nitrogen (N). Odorous compounds are not a product of the biologically mediated conversion process.

The process comprises introducing organic waste containing sufficient concentrations of total BOD and organic nitrogen (measured as Total Kjeldahl Nitrogen (TKN)) into a micro-electron acceptor environment defined by at least one cell, tank, pond, unit or the like, wherein resides a diverse microbial community comprising large populations of facultative heterotrophic fermentors, autotrophic nitrifiers, facultative heterotrophic denitrifiers, and autotrophic ammonium denitrifiers as well as other classes of organisms that coexist in this engineered environment. The microbial populations within the micro-electron acceptor environment are brought into contact with the substrate of the organic waste via some means, generally including agitation or mixing where the microorganisms exist as suspended populations within the micro-electron acceptor environment, or by flowing the waste stream across settled or attached populations of organisms, or by other contact means.

The amount of microorganisms within the biologically mediated conversion process is generally controlled to remove large cellulosic solids and large particulate solids and to concentrate microbes through the use of recycle loops, clarifiers or other solids concentrating or separating techniques (such as centrifugation or filtration). Excess microorganisms are removed from the micro-electron acceptor environment via a variety of possible mechanisms to maintain favorable microbial health and viability. Preferably, all microorganisms generated in the micro-electron acceptor environment are eventually harvested, dewatered and/or dried to create a nutrient rich humus product, and/or they may be treated further and/or combined with other materials to create a variety of differing nutrient rich humus products, such as, for example, animal feed.

Dissolved oxygen concentrations are monitored within the micro-electron acceptor environment and when necessary, oxygen is introduced at rates and in stoichiometric ratios so that the concentration of dissolved oxygen does not exceed about 2.0 mg/L, and preferably does not exceed about 0.1 mg/L. The increased rate of this low oxygen biologically mediated conversion process of the present invention allows for reduced size treatment facilities or makes it possible to treat a higher waste load in an existing system. Further, the production rate of the nutrient rich humus material is also believed to potentially be enhanced.

Applicants have also discovered that adding or developing PAO populations which are functional in the micro-electron acceptor environment can result in an increase in the conversion of soluble phosphorus within the organic waste stream into particulate form. The non-soluble phosphorus containing particulates, settleable and/or suspended solids (which may include microbial cells, chemical precipitates, complexes and/or aggregates of cells, precipitates and/or other insoluble materials), can then be removed from the micro-electron acceptor environment as harvested humus material. Applicants have surprisingly discovered that the improved nutrient removal of the process of the present invention can be achieved with the addition of an anaerobic environment and the continuous recycling of microorganisms between the micro-electron acceptor environment and the anaerobic environment.

Surprisingly, the improved nutrient conversion and removal occurs even though the process does not contain the relatively high concentrations of oxygen, nitrate, nitrite and/or other electron acceptors that were previously thought to be necessary for such nutrient removal processes. It is well known in the art that an electron acceptor, such as oxygen, is required to achieve phosphorus removal which is why conventional phosphorus removal systems typically utilize aeration to increase dissolved oxygen concentrations above 2.0 mg/L in an aerobic unit process. Most recently, high nitrate concentrations have been identified as a possible electron acceptor in place of oxygen. See Janssen, P. M. J., *Biological Phosphorus Removal, Manual for design and operation*, IWA Publishing (2002) at p. 18-20. In the process of the present invention, the concentrations of molecular oxygen, nitrate, and nitrite, if existing in the process at all, are very low individually, and collectively.

Applicants believe that increased biologically mediated nutrient conversion according to the process of the present invention is partially due to (i) the unique distribution of organisms in the process, particularly due to the additional presence, in significant quantity, of an additional group of PAOs, and (ii) the fact that despite the very low concentrations of electron acceptors, substantial mass transfer reactions take place. In normal wastewater treatment where a Bio-P process has been installed, the relative concentration of PAOs to other types of microorganisms is believed to be low. See Janssen, P. M. J., *Biological Phosphorus Removal, Manual for design and operation*, IWA Publishing (2002) at p. 20-21. This is true whether or not nitrification and denitrification occurs in the process. However, in the process of the present invention, the relative concentrations of nitrifiers and denitrifiers are believed to be higher than in conventional wastewater treatment systems, and with the addition or development of the micro-electron acceptor phosphorus accumulating capability of these organisms, the process favors the further growth and maintenance of PAO denitrifiers over the normal denitrifiers resulting in high concentrations of nitrifiers and PAO denitrifiers.

High concentrations of nitrifiers means sufficient quantities of nitrifiers are present such that when molecular oxygen enters the environment it is rapidly utilized by the nitrifiers to oxidize ammonia, which is available in high concentrations in the environment of the present invention, to nitrite and nitrate. High concentrations of denitrifiers means sufficient quantities of denitrifiers are present such that when nitrite or nitrate enters the environment from the oxidization of ammonia by the nitrifiers, it will be rapidly denitrified. In the process of the invention without appropriately induced and maintained microbial populations with the micro-electron acceptor phosphorus accumulating capability, it is believed that normal non-PAO denitrifiers will predominate over PAO denitrifiers since they are more energetically efficient than the PAO denitrifiers. With the development and/or addition of appropriately induced and maintained microbial populations with the micro-electron acceptor phosphorus accumulating capability, the process confers a selective advantage on the PAO denitrifiers over the normal denitrifiers and the Bio-P process will predominate. Surprisingly, all of this still occurs in the micro-electron acceptor environment of the process in which molecular oxygen, nitrate, and nitrite each exist in very low concentrations individually and collectively. For example, nitrate concentrations in conventional wastewater treatment systems with nitrification are typically in the range of 4-8 mg/L. The process of the present invention operates at nitrate concentrations below about 5 mg/L and can operate at concentrations below about 0.5 mg/L. Thus, even though the concentrations of electron acceptors are low, the high concentration of PAO denitrifiers results in a rapid mass transfer through the denitrifying process which still favors the PAO denitrifiers over the non PAO denitrifiers.

Applicants believe that another possible reason that the development and/or addition of appropriately induced and maintained microbial populations with the micro-electron acceptor phosphorus accumulating capability can surprisingly induce additional quantities of soluble phosphorus to be converted into particulate form is due to the unique quantities and distribution of the microbial organisms in the process. The microbial organisms induce an environment favorable to the incorporation of soluble phosphorus into complexes which may include microbial cells, chemical precipitates, complexes and/or aggregates of cells, precipitates and/or other insoluble materials, such that the soluble phosphorus is captured in such aggregates and can then be removed as harvested humus material leading to an effluent from the biologically mediated conversion process which is low in soluble phosphorus.

Applicants have also discovered that microbial populations with the micro-electron acceptor phosphorus accumulating capability can surprisingly thrive without a physically separated and defined anaerobic environment. Denitrifying PAOs are not expected to have a selective advantage to grow in low electron acceptor environments without a physically separated and defined anaerobic environment. However, Applicants have determined that in the process of the invention, MEAPAOs (PAOs with the surprising ability to convert phosphorus without a physically separated and defined anaerobic environment) will thrive when the anaerobic environment previously added to the process of the invention is subsequently removed. This continued phosphorus conversion capability is in stark contrast to all other known forms of enhanced biological phosphorus removal, all of which require the presence of a well defined anaerobic zone. Applicants believe that the MEAPAOs' continued existence and functionality in the micro-electron acceptor environment of the present invention is due, in part, to the diversity and size of the microorganism population in the process.

Applicants have also surprisingly discovered that the increased nutrient conversion and removal process can be accomplished in the micro-electron acceptor environment without ever adding a physically separated and defined anaerobic environment. This can be accomplished by adding/seeding the process of the invention with MEAPAOs that were created/developed elsewhere, perhaps at another facility where the process is operated and an anaerobic environment was added. Applicants believe that the MEAPAOs will quickly acclimate and continue to function in the process.

Lastly, Applicants have surprisingly discovered that MEAPAOs can even function and thrive in the process of the invention without ever adding a physically separated and defined anaerobic environment and without seeding the process with MEAPAOs from another process. Applicants believe that according to the process of the invention, through varying low concentrations of electron acceptors in local zones (microenvironments) of the larger micro-electron acceptor environment containing relatively high phosphorus to nitrogen ratios (greater than about 0.16 and as high as about 0.3 to 0.5), MEAPAOs will develop and thrive. It is believed that the MEAPAOs will evolve through varying microenvironments that approach an anaerobic state.

According to the process of the present invention, an influent waste stream containing P/N Ratios higher than about 0.17, and sometimes as high as about 0.30 to 0.50, or higher, can be treated and still have effluent discharges with low quantities of phosphorus. Approximately 50% or more of the influent waste stream soluble phosphorus can be converted into particulate form, incorporated into the humus material, and removed when that humus material is harvested.

DETAILED DISCLOSURE OF THE INVENTION

In the low oxygen biologically mediated conversion process of the present invention, evolution of a natural microbial community is encouraged under low dissolved oxygen conditions leading to a plurality of desirable ecological niches. Further, when the flowable organic waste stream to the biologically mediated conversion process of the present invention contains relatively high concentrations of total BOD and TKN, and the TKN to total BOD by weight ratio is relatively high, e.g. when the mass ratio of TKN:total BOD is more than about 1:20 by weight, and preferably more than about 2.5:20, the resulting low oxygen biologically mediated conversion process can be an effective processing approach for rapid, substantially odorless, biologically mediated conversion of the waste stream substrates (including nutrients).

Figure 1:
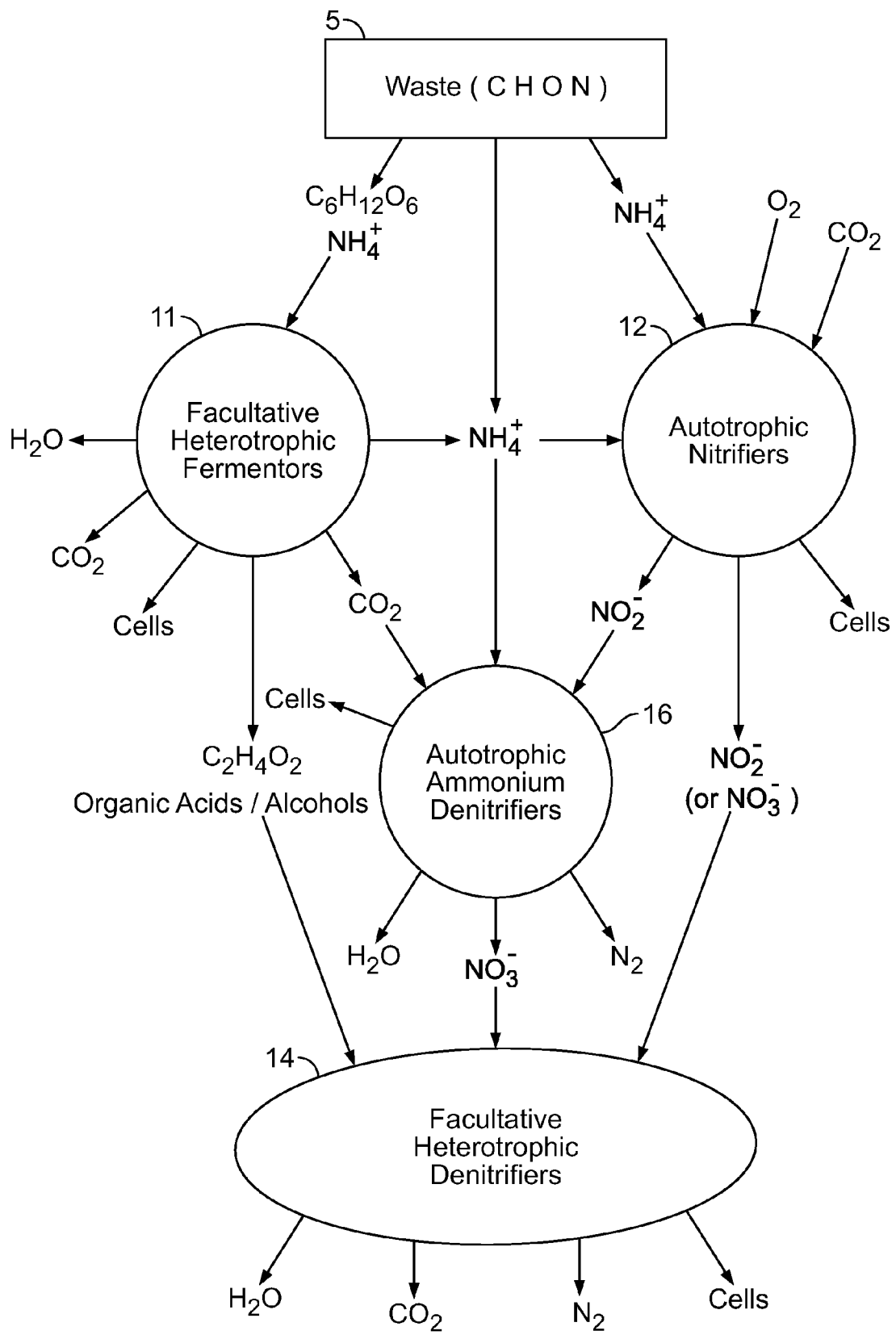
FIG. 1 comprises a schematic illustrating the predominant interrelationships of the organic waste, the major microbial groups responsible for biologically mediated conversion, the intermediate breakdown substances, and the final products of the process of the invention.

When the influent oxygen loading and the dissolved oxygen concentration in a biological treatment process are suitably regulated to maintain a dissolved oxygen concentration of less than about 2.0 mg/L, preferably less than about 0.1 mg/L, in the process, a series of compatible, and overlapping and simultaneously occurring, ecological niches are formed. These niches so formed promote the growth and coexistence of desirable major populations of facultative heterotrophic fermentors, autotrophic nitrifiers, facultative heterotrophic denitrifiers, and autotrophic ammonium denitrifiers over the growth inhibition of other microbial populations such as heterotrophic aerobes, which usually dominate the bacteria present in conventional wastewater treatment processes. FIG. 1 comprises a schematic illustration of the interrelationships believed to exist between these microorganisms and the major substrates being affected during the biologically mediated conversion process of the present invention.

With reference to FIG. 1, populations of facultative heterotrophic fermentors 11 will thrive on the organic wastes 5 available, while the growth of obligate aerobes and obligate anaerobes, that might otherwise be expected to compete for the carbon and energy sources, are suppressed by the very low dissolved oxygen concentrations maintained. There will generally be enough oxygen available to inhibit obligate anaerobes but not enough to allow the obligate aerobes to be competitive.

In typical biological treatment processes, enough oxygen is supplied to the facultative heterotrophs for complete biologically mediated conversion of the carbon containing compounds. In the low oxygen biologically mediated conversion process of the present invention, it is believed that the limitation of the oxygen concentration induces the facultative heterotrophs to shift from an oxidative metabolism to a fermentative metabolism. Thus, the facultative heterotrophic fermentors ferment the organics present to organic acids and/or alcohols instead of oxidizing them through oxidative phosphorylation to carbon dioxide and water.

The oxygen introduced into the process of the present invention is taken up by the autotrophic nitrifiers 12 to nitrify, generally by oxidizing to nitrite ($NO_2^-$) and/or nitrate ($NO_3^-$), the nitrogen containing compounds in the system. In a typical biological treatment process, the organisms with an oxidative metabolism take up the oxygen. Since the oxygen introduced into the process of the present invention appears to be readily taken up by autotrophic nitrifier 12 populations, simplified control systems can be used to control oxygen loading to promote nitrification in a low dissolved oxygen process, without promoting the competing growth of obligate aerobes and facultative heterotrophic microorganisms using oxidative phosphorylation. The desired dissolved oxygen concentration for the process of the present invention is below the point where the organisms using facultative fermentative pathways predominate over organisms using oxidative pathways. Applicants have found this dissolved oxygen concentration is less than about 2.0 mg/L and preferably, is less than about 0.1 mg/L. Generally oxygen present in the process in excess of the requirements for nitrification by the autotrophic nitrifiers 12 will be used preferentially to support heterotrophic aerobic activity. Within limits, the scavenging action of these heterotrophic aerobes removes the excess oxygen and maintains the present invention's oxygen concentration at very low levels.

Surprisingly, the low oxygen process of the present invention is believed to also use very low oxygen concentrations to establish a population of facultative heterotrophic denitrifiers 14 that use the $NO_2^-$ and/or $NO_3^-$ produced by the autotrophic nitrifiers 12 as their electron acceptor instead of dissolved oxygen. These facultative heterotrophic denitrifiers 14 then convert the organic acids and alcohols produced by the facultative heterotrophic fermentors 11 and other waste stream organics present into $CO_2$ and $H_2O$, while reducing the $NO_2^-$ and/or $NO_3^-$ nitrogen to $N_2$. Sustaining low oxygen concentrations that are high enough to concurrently allow the autotrophic nitrifiers 12 to thrive and nitrify ammonium ($NH_4^+$) to $NO_2^-$ and/or $NO_3^-$ and low enough to establish populations of facultative heterotrophic denitrifiers 14 able to reduce $NO_2^-$ and/or $NO_3^-$ to $N_2$ is of benefit to the current invention. This low oxygen environment also allows the establishment of autotrophic ammonium denitrifiers 16 capable of using $NO_2^-$ to oxidize $NH_4^+$ to $N_2$ and a small portion of $NO_3^-$ in reducing $CO_2$ to cell material (biomass).

bine with the nitrite and/or nitrate produced by the autotrophic nitrifiers 12 to provide this strong niche for facultative heterotrophic denitrifiers 14 and autotrophic ammonium denitrifiers 16. The facultative heterotrophic denitrifiers 14 in turn denitrify the nitrite and/or nitrate to nitrogen gas while the autotrophic ammonium denitrifiers 16 oxidize $NH_4^+$ to $N_2$ as well and return $NO_3^-$ to the facultative heterotrophic denitrifiers 14. Ultimately, the organic waste is converted to $N_2$, $CO_2$, $H_2O$, clean water and beneficial soil products. The low oxygen biologically mediated conversion process of the present invention, therefore, provides for substantially odorless, efficient, treatment of organic waste.

Table 1 below provides example stoichiometric relationships that illustrate the types of biochemical reactions that drive this process.

TABLE I

EXAMPLE STOICHIOMETRIC RELATIONSHIPS

1) Fermentation of glucose into acetic acid by facultative heterotrophic fermentors:
$C_6H_{12}O_6 \rightarrow 3\ C_2H_4O_2$
2) Cell synthesis by fermenting glucose into acetic acid by facultative heterotrophic fermentors:
$2\ C_6H_{12}O_6 + 2\ NH_4^+ + 2\ OH^- \rightarrow 2\ C_5H_7O_2N + C_2H_4O_2 + 8\ H_2O$
3) Observed cell yields when fermenting glucose into acetic acid by facultative heterotrophic fermentors:
$1.00\ C_6H_{12}O_6 + 0.05\ NH_4^+ + 0.05\ OH^- \rightarrow 0.05\ C_5H_7O_2N + 3.025\ C_2H_4O_2 + 0.20\ H_2O$
4) Endogenously nitrifying ammonia to nitrite by autotrophic nitrifiers:
$2\ NH_4^+ + 2\ OH^- + 3\ O_2 \rightarrow 2\ NO_2^- + 2\ H^+ + 4\ H_2O$
5) Cell synthesis by nitrifying ammonia to nitrite by autotrophic nitrifiers:
$48\ NH_4^+ + 40\ HCO_3^- + 8\ OH^- + 20\ O_2 \rightarrow 8\ C_5H_7O_2N + 40\ NO_2^- + 40\ H^+ + 72\ H_2O$
6) Observed cell yields when nitrifying ammonia to nitrite with Nitrosomonas by autotrophic nitrifiers. USEPA, Manual: Nitrogen Control (1993), Office of Research and Development, EPA/625/R-93/010, Washington, DC:
$1.0\ NH_4^+ + 1.44\ O_2 + 0.0496\ CO_2 \rightarrow 0.01\ C_5H_7O_2N + 0.990\ NO_2^- + 0.970\ H_2O + 1.99\ H^+$
7) Observed cell yields when oxidizing nitrite to nitrate with Nitrobacter by autotrophic nitrifiers (from USEPA 1993):
$1.00\ NO_2^- + 0.00619\ NH_4^+ + 0.031\ CO_2 + 0.0124\ H_2O + 0.50\ O_2 \rightarrow \rightarrow 0.00619\ C_5H_7O_2N + 1.00\ NO_3^- + 0.00619\ H^+$
8) Observed cell yields for the overall nitrification reaction of ammonia to nitrate by autotrophic nitrifiers (from USEPA 1993):
$1.00\ NH_4^+ + 1.89\ O_2 + 0.0805\ CO_2 \rightarrow 0.0161\ C_5H_7O_2N + 0.952\ H_2O + 0.984\ NO_3^- + 1.98\ H^+$
9) Endogenously denitrifying nitrite to nitrogen gas using acetate by facultative heterotrophic denitrifiers:
$3\ C_2H_4O_2 + 8\ NO_2^- + 8\ H^+ \rightarrow 4\ N_2 + 6\ CO_2 + 10\ H_2O$
10) Cell synthesis by denitrifying nitrite to nitrogen gas using acetate by facultative heterotrophic denitrifiers:
$95\ C_2H_4O_2 + 32\ NH_4^+ + 40\ NO_2^- + 8\ H^+ \rightarrow 32\ C_5H_7O_2N + 20\ N_2 + 30\ CO_2 + 146\ H_2O$
11) Observed cell yields when denitrifying nitrite to nitrogen gas using methanol by facultative heterotrophic denitrifiers (from USEPA 1993):
$1.00\ NO_2^- + 0.67\ CH_3OH + 0.53\ H_2CO_3 \rightarrow 0.04\ C_5H_7O_2N + 0.48\ N_2 + 1.23\ H_2O + 1.00\ HCO_3^-$
12) Endogenously and autotrophically denitrifying ammonium to nitrogen gas using nitrite:
$8\ NH_4^+ + 23\ NO_2^- + 6\ H^+ \rightarrow 11\ N_2 + 9\ NO_3^- + 19\ H_2O$
13) Cell synthesis when autotrophically denitrifying ammonium to nitrogen gas using nitrite:
$2\ NH_4^+ + 27\ NO_2^- + 10\ HCO_3^- + 10\ H^+ \rightarrow N_2 + 25\ NO_3^- + 2\ C_5H_7O_2N + 5\ H_2O$
14) Observed cell yields for the autotrophic denitrification of ammonium to nitrogen gas using nitrite as an electron acceptor:
$NH_4^+ + 1.32\ NO_2^- + 0.066\ HCO_3^- + 0.126\ H^+ \rightarrow \rightarrow 1.02\ N_2 + 0.26\ NO_3^- + 0.066CH_2O_{0.5}N_{0.15} + 2.03\ H_2O$ Application of this concurrent or simultaneous nitrification and denitrification process results in a nutrient rich humus material made by a process for the substantially odorless biological treatment of solid and liquid organic wastes, particularly animal farm wastes.

Thus, referring to FIG. 1, applicants have found that controlling the amount of oxygen introduced into a biological treatment process comprising a waste stream 5 having a relatively high concentration of TKN and total BOD in a ratio of more than about 1:20 provides a strong niche for facultative heterotrophic denitrifiers 14. The organic acids and/or alcohols produced by the facultative heterotrophic fermentors 11, together with other organics present in the waste stream and dead microbial cells or cell fragments, will efficiently com- Reaction numbers 1, 2 and 3 are examples of fermentation processes performed by the facultative heterotrophic fermentors 11 using glucose ($C_6H_{12}O_6$) as the model carbon source and acetic acid ($C_2H_4O_2$) as the model product. Reaction 1 shows the general fundamental relationship for the endogenous energy producing reaction of the fermentation. Reaction 2 shows the general fundamental relationship for the coupling of energy production with the synthesis of a microbial biomass (represented as $C_5H_7O_2N$). Reaction 3 shows how these two reactions are combined in actual operating conditions with experimentally observed cell yields. Although the reactions shown use glucose and acetic acid, as known by those of ordinary skill in the art, many other compounds may be substituted. For example carbohydrates, proteins, cellulosics, and/or other organic compounds containing oxygen may be substituted for the glucose; and ethanol, lactic acid, propionic acid, butyric acid, or other organic acids, alcohols, aldehydes, and the like may be substituted for the acetic acid. These types of compounds, along with amino acids, peptides, nucleotides, and other compounds contained in the influent waste stream and/or resulting from microbial cell death and lysis, are known to serve as substrates similar to the acetic acid shown in the denitrification pathways represented by reaction numbers 9 and 10 and the methanol shown in the pathway represented by reaction 11.

Reaction numbers 4, 5, and 6 depict the reactions for the nitrification of ammonia by the autotrophic nitrifiers 12. Reaction 4 shows the general fundamental relationship for the endogenous energy producing reaction in which ammonia is nitrified to nitrite. Reaction 5 shows the general fundamental relationship for the coupling of reaction 4 with microbial cell synthesis. Reaction 6 illustrates how the combination of reactions 4 and 5 describes the observed yields of microbial cells that are synthesized during the nitrification of ammonia to nitrite by Nitrosomonas type bacterial species. Conventional nitrification processes employ a second step for the nitrification of nitrite to nitrate by Nitrobacter type bacterial species and this pathway may be present in the process of the current invention to varying degrees depending on the specific dynamic operating conditions imposed. In contrast, the process of the present invention utilizes facultative heterotrophic denitrifiers 14 and autotrophic ammonium denitrifiers 16 to denitrify the nitrite to $N_2$. However, if nitrate were present or produced in the process of the present invention, the facultative heterotrophic denitrifiers 14 would denitrify it to $N_2$ as well. Reaction 7 shows this process relative to observed yields of microbial cells and reaction 8 shows the combined nitrification of ammonia to nitrate (reaction numbers 6 and 7), again relative to observed yields of microbial cells.

Similarly, the reactions of the facultative heterotrophic denitrifiers 14, reaction numbers 9, 10, and 11, show the biologically mediated conversion of nitrite (similar reactions could be used to show the biologically mediated conversion of nitrate) to $N_2$ gas. This is illustrated using general fundamental relationships, endogenously (9), and during cell synthesis (10), when using acetate as an electron acceptor. In reaction 11 the denitrification is shown relative to observed yields of microbial cells and uses methanol ($CH_3OH$) as an electron acceptor.

Reactions 12, 13, and 14 portray the autotrophic conversion of ammonium and $CO_2$ to nitrate and $N_2$ by the autotrophic ammonium denitrifiers 16. As before, reaction 12 shows the endogenous process, reaction 13 shows the process relative to cell synthesis, and reaction 14 shows the combined process relative to observed cell yields. In reaction 14, the microbial cell mass was represented as $CH_2O_{0.5}N_{0.15}$ instead of $C_5H_7O_2N$ to reflect its publication reference. Astrid A. Van de Graaf, Peter de Bruijn and Lesley A. Robertson, *Autotrophic Growth of Anaerobic Ammonium-Oxidizing Micro-organisms in a Fluidized Bed Reactor*, Microbiology, 142:2187-96 (1996).

The nitrate produced in the autotrophic ammonium denitrification reactions is consumed by denitrification reactions very similar to those shown in reactions 9, 10, and 11.

In order to attain and maintain dynamic equilibrium of ecological niches, it is important that enough growing microorganisms be present in the total treatment system so that the population as a whole can evolve to optimally populate the four ecological niches in a reasonable time period. Many waste streams are very complex, containing many different chemical constituents, many of which contribute to both BOD and TKN. Consequently there are many possible fermentative pathways that the facultative heterotrophs can use. The waste stream also provides even more possible substrates for the denitrification process including dead cells and cell fragments as well as the fermented products of facultative heterotrophic fermentors 11. A large dynamic microbial population can evolve to optimally fit the available distributions of materials in a waste stream and then can evolve to maintain this optimal fit as the waste stream and other environmental conditions, such as temperature, continually change. Thus, maintenance of a sufficient population of microorganisms provides the system with efficient adaptability to system changes normally associated with wastewater treatment systems. The larger the total population of microbes growing at a given average growth rate, the larger the number of mutations that will occur. Thus, the process of the present invention benefits from a sufficient quantity of microorganisms to maintain a sufficient quantity of mutations, thereby providing for an efficient, dynamic biologically mediated conversion process.

When optimizing the evolutionary criteria of a population of microbes, there is a preferred minimum population size and growth rate. This is expressed as both a minimum mass of microbes and as a function of total BOD and TKN loading. Generally the process of the present invention requires a minimum population of about $10^{15}$ microbes or more, with an average doubling time of about 30 days or less. A less efficient process of the invention can be achieved with a greater quantity of microbes regenerating at a slower rate (i.e. a larger doubling time). Preferably, the sustained minimum operating population is comprised of from about $10^{17}$ to about $10^{18}$ microbes with a doubling time of about ten days or less, to ensure the presence of an adequate biomass to treat the waste stream. In addition to these minimum population size or mass criteria, it is also preferred to have at least about $10^{13}$ microbes with a doubling period of 30 days or less, per pound of influent total BOD or TKN. These two biomass parameters can alternatively be expressed as more than about $10^{15}$ base pair replications per second for the minimum population and about $10^{17}$ base pair replications per pound of total BOD or TKN loaded into the treatment process. Most preferred values run about 100 times these figures.

Thus, the beneficial results of the low oxygen biologically mediated conversion process of the present invention are believed to be a result of three general considerations. First, the process benefits from the presence of a dynamically responsive, diverse, microbial community in sufficient numbers or mass of microorganisms, growing at sufficient rates in the process, to allow the microbial community to adapt in a workable time frame to achieve a dynamic equilibrium. Second, organic and nitrogen loading allows an energy, carbon and nitrogen balance to occur between the microbial populations of facultative heterotrophic fermentors, 11 autotrophic nitrifiers 12, facultative heterotrophic denitrifiers 14 and autotrophic ammonium denitrifiers 16. Third, control of dissolved oxygen levels and/or oxygen additions creates and maintains the populations of facultative heterotrophic fermentors 11, autotrophic nitrifiers 12, facultative heterotrophic denitrifiers 14 and autotrophic ammonium denitrifiers 16.

The low oxygen biologically mediated conversion process of the present invention is one in which the organic constituents contained in a waterborne waste stream, such as total BOD and TKN are converted to a mixture of microbial cells, very stable refractory organic humus solids and inert material, inert nitrogen gas, carbon dioxide, and water.

In a process of the present invention, a BOD and TKN containing waste stream, having a TKN:total BOD ratio of about 1:20 or more is introduced into a micro-electron acceptor environment containing a microbial community comprising large populations of facultative heterotrophic fermentors 11, autotrophic nitrifiers 12 facultative heterotrophic denitrifiers 14 and autotrophic ammonium denitrifiers 16. The waste stream of BOD and TKN is brought into close contact with the microorganism populations by any suitable means, preferably by mechanically mixing and/or by flowing the aqueous stream across settled or attached populations of organisms. The micro-electron acceptor environment of the process of the invention is generally contemplated as an open, bermed cell arrangement and is conveniently adaptable to automated operation. However, closed tanks, cells or units could be utilized for the aqueous environment. Oxygen is introduced into this environment at controlled rates and in specific stoichiometric ratios so that the concentration of dissolved oxygen is maintained less than about 2.0 mg/L and most preferably does not exceed about 0.1 mg/l. The aeration means could be accomplished via diffused aeration, mechanical mixers, surface mixers, surface atmospheric transfer, algal generation or other equivalent means. The concentrations of molecular oxygen, nitrate, and nitrite in the micro-electron acceptor environment are very low, preferably below about 5 mg/L.

Solids in the micro-electron acceptor environment may be clarified by floating or settling, thickened, centrifuged, separated or treated by other equivalent concentrating means and recycled to maintain the biomass requirements. Excess microorganisms may be harvested, dewatered, and/or dried and sometimes further treated and/or combined with other materials to create a nutrient rich humus material that can be beneficially used.

Figure 2:
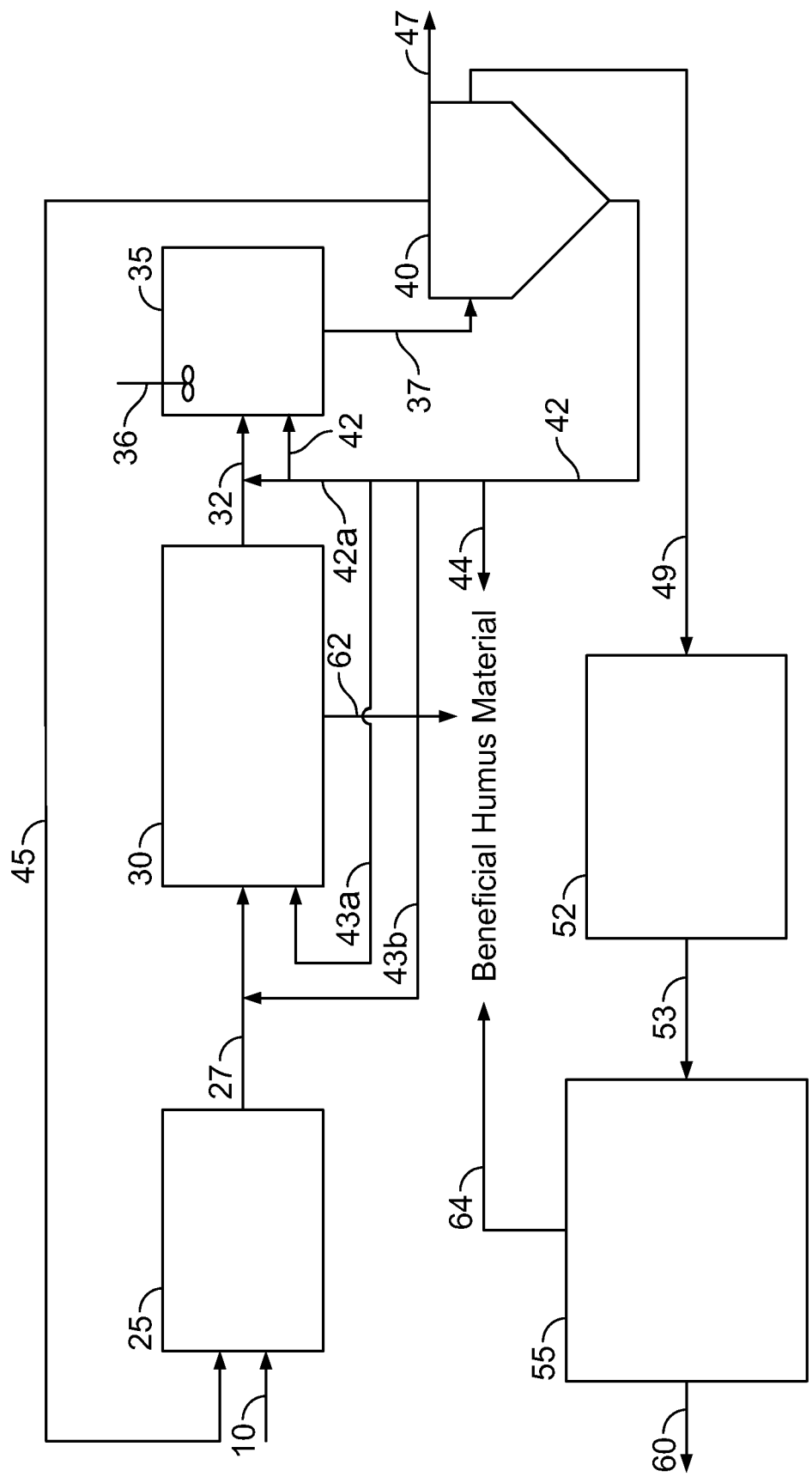
FIG. 2 comprises a flow diagram of an embodiment of the process of the invention for a typical installation for a dairy farm.

FIG. 2 illustrates a first embodiment of the invention in a dairy farm treatment system. Wash water, liquid wastewaters 10 and/or recycled treated flushing water 45 is used to transport and slurry the animal excrement and wastes 27 from an animal confining barn, penning area or the like 25 to a solids concentrating treatment unit 30 which acts as a multi-zone composting, solids dewatering and biologically mediated conversion means. The solids concentrating treatment unit 30, could be a plurality of holding cells or zones, surrounded by containment berms which are generally arranged so that individual or sets of cells may be periodically interrupted from the process so that their contents may be harvested, dewatered and/or dried for recovery of bioconverted organic humus. The principle function of the solids concentrating treatment unit 30 is to convert excess biomass to an ecologically beneficial humus material suitable for recovery. The process of the present invention, however, is not limited to the bermed holding cell. Other solid concentrating treatment units 30, both open and closed to the surrounding environment, such as clarifiers, flotation units, screens, filter presses, heat dryers, and the like could be used in addition to or in place of the bermed holding cell.

The solids concentrating treatment unit liquid effluent stream 32 is treated by a microorganism growth managing and enhancing unit 35 wherein microbes are grown, enhanced, modified and/or concentrated. The principle function of a microorganism growth managing and enhancing unit 35 is to promote the growth of biological microorganisms which entrain the soluble material of the waste stream and continue the biologically mediated conversion process. A microorganism growth managing and enhancing unit 35 generally comprises a suitably sized pond environment, tank, cell or the like.

The dissolved oxygen concentration and the amount of microorganisms in the micro-electron acceptor portion of the process stream are monitored; specifically low dissolved oxygen and high microorganism quantity are sought to be maintained. Dissolved oxygen concentrations are controlled by means of aeration unit 36 that could include a dissolved oxygen aeration system, some type of mechanical mixers, enhanced natural surface aeration, submerged compressed air diffusers or the like. The biomass quantity is maintained by a biomass concentrating means 40 that concentrates the liquid effluent stream 37 from the microorganism growth managing and enhancing unit 35 and/or recycles it.

The treated microorganism growth managing and enhancing unit liquid effluent stream 37 is directed to the biomass concentrating means 40 such as a clarifier wherein the biomass is settled and/or floated, thickened, separated and/or concentrated so that higher concentrations of microbes can be recycled back to the microorganism growth managing and enhancing unit 35. Other treatment units besides clarifiers could be used to accomplish the biomass concentrating means 40. For example, settling tanks, cyclones, centrifuges, filter presses, filters, screens, and/or membranes could be used. Concentrated biomass sludge containing large quantities of living microbes is recycled via stream 42 back to the influent end of the microorganism growth managing and enhancing unit 35 to maintain biomass quantity therein. Alternatively, the concentrated biomass sludge could be directed to and combined with the solids concentrating treatment unit liquid effluent stream 32, via stream 42a, before entering the microorganism growth managing and enhancing unit 35, and/or it could be directed, via stream 43a, to the influent end of the solids concentrating treatment unit 30, and/or it could be directed to and combined with, via stream 43b, the slurried animal excrement and wastes 27 before entering the solids concentrating treatment unit 30, and/or it could be removed from the system via stream 44 for conversion into a beneficial humus material or other uses. The liquid effluent from the biomass concentrating means 40 (for example the overflow if a clarifier) could be used either as flush or wash water directed back via stream 45 to the barn, penning area or the like 25, and/or it could be discharged from the system via stream 47 as a nutrient rich aqueous fertilizer for crops and/or it could be directed via stream 49 for further treatment prior to irrigation or discharge.

Ultimately, maintaining the process parameters, specifically the biomass and dissolved oxygen concentration parameters creates the micro-electron acceptor portion of the treatment system. In FIG. 2, the micro-electron acceptor portion includes the flowable portion of the solids concentrating treatment unit 30, the microorganism growth managing and enhancing unit 35 and the biomass concentrating means 40.

In an alternative embodiment, the liquid effluent from the biomass concentrating means 40 undergoes further treatment. Clarified, settled, or separated effluent in stream 49 undergoes further biologically mediated conversion in an additional microorganism growth managing and enhancing unit 52. The additional microorganism growth managing and enhancing unit effluent is directed, via stream 53, for further solids, total BOD and nutrient removal such as by means of a polishing unit 55.

A polishing unit 55 generally constitutes a flooded vegetative complex and preferably comprises a wetlands environment or overland flow system made up of plants and microorganisms suitable for capturing the relatively small quantity of nutrients contained in the effluent discharged from a microorganism growth managing and enhancing unit 52. In a preferred embodiment, the polishing unit 55 generally comprises multiple, distinct cells arranged such that liquid discharged from a microorganism growth managing and enhancing unit can be directed thereto in a variable and controlled manner. An especially preferred polishing unit generally comprises a suitable low lying field with a bermed perimeter and cross berms which create two or more liquid holding cells, wherein effluent from a microorganism growth managing and enhancing unit can be variably directed to one or more cells of the polishing unit. The liquid effluent from a polishing unit is sufficiently treated for reuse, wetland creation or maintenance, or discharge to a water body via stream 60. As can be done for the solids concentrating treatment unit (stream 62), a polishing unit 55 could be removed from service and the solids within could be harvested 64 and dried for humus material.

Alternately, conventional wastewater treatment processes could be used to further treat the stream discharged from the biomass concentrating means 40 via stream 49, or from an additional microorganism growth managing and enhancing unit 52 via stream 53, to the quality desired before recycle, reuse or discharge 60. In yet another embodiment, the process of the invention could be modified to speed up the biologically mediated conversion process by removing solids that are digested at a slower rate by the microorganisms (i.e. cellulosic and course organic and inorganic solids) at the beginning of the process. This can be accomplished by replacing solids concentrating treatment unit 30 with a solids separating means and adding another means of concentrating the microorganism growth managing and enhancing unit liquid effluent stream 37 to achieve the process' biomass retention requirements.

Figure 3:
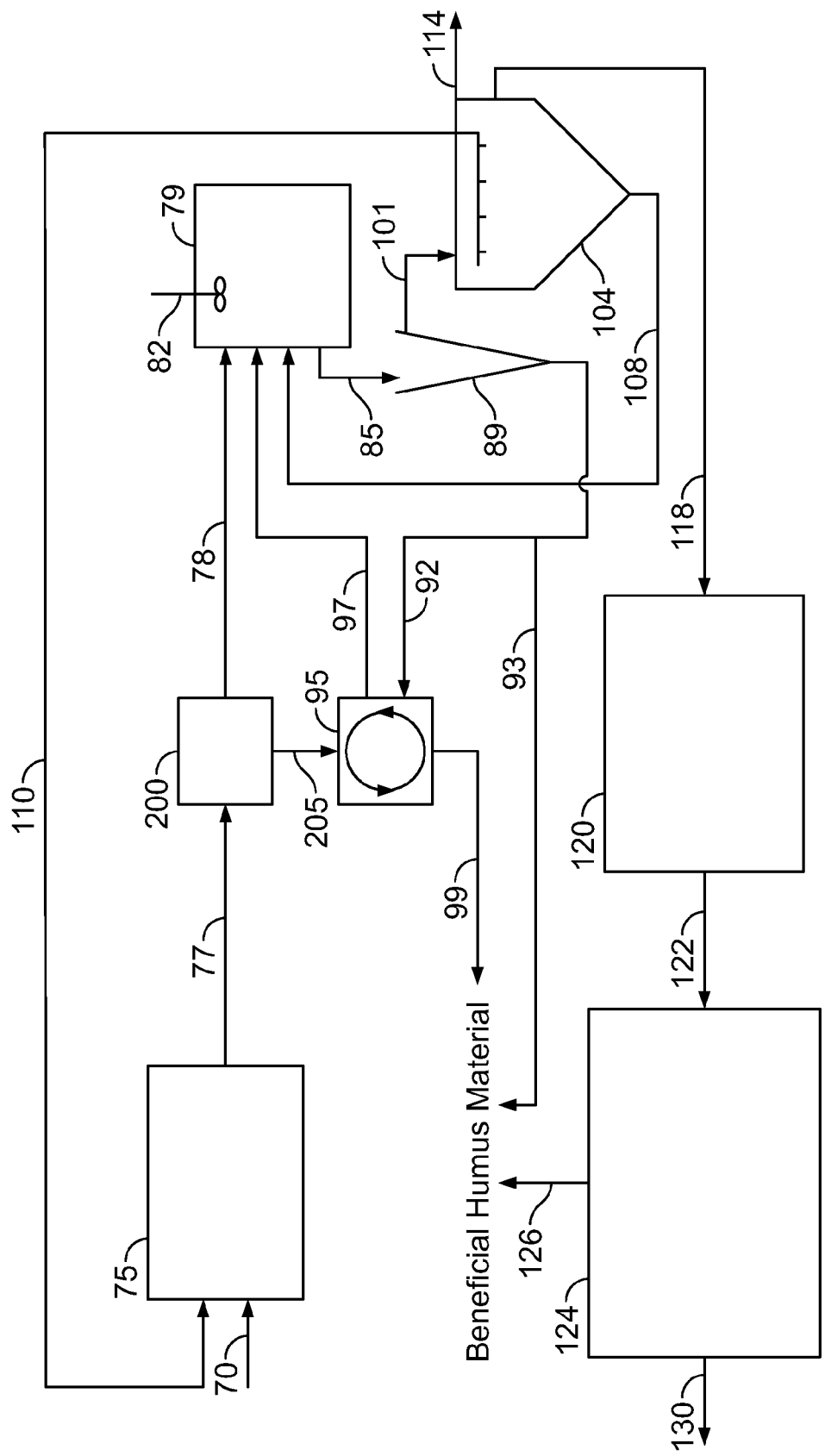
FIG. 3 comprises a flow diagram of another embodiment of the process of the invention for a higher rate dairy farm system.

As shown in FIG. 3, wash water, liquid wastewaters 70 and/or recycled flushing water 110 are passed through an animal confining barn, penning area or the like 75. The slurried animal excrement waste is directed via 77 to a solids separating means 200, to separate cellulosic solids and other course organic and inorganic solids from soluble and finely suspended solids. The separated stream is then directed to a microorganism growth managing and enhancing unit 79 via stream 78 wherein microbes are grown, enhanced, modified and/or concentrated. The coarse, mostly cellulosic solids, removed by the solids separating means 200 are delivered by stream 205 to a mixer 95 for further processing or may be removed from the system for other uses.

The dissolved oxygen concentration and the amount of microorganisms in the micro-electron acceptor portion of the process stream are monitored for compliance with process parameters, specifically low dissolved oxygen and high microorganism quantity. Dissolved oxygen concentrations are controlled by means of aeration unit 82 that could include a dissolved oxygen aeration system, some type of mechanical mixers, submerged compressed air diffusers or the like. The biomass quantity in the system is maintained by concentrating and recycling the effluent from the microorganism growth managing and enhancing unit 79.

The treated microorganism growth managing and enhancing unit liquid effluent stream 85 is directed to a biomass concentrating means 89 wherein the biomass is settled, thickened, separated and/or concentrated. Further solids treatment for the concentrated biomass from the biomass concentrating means 89 is achieved by directing the solids via stream 92 to a solids mixer 95. Alternatively, these solids may be harvested via stream 93 for use as soil for plant growth product additives, or for feed and food stocks or raw materials for such processed stocks. The solids mixer 95 mixes the concentrated biomass from the biomass concentrating means 89 delivered to it via stream 92, with the cellulosic and other course solids separated from stream 77 by the solids separator 200 that is delivered to the mixer via stream 205. Excess liquid is directed back to the microorganism growth managing and enhancing unit 79 via stream 97 and the mixed solids are removed via stream 99 and harvested, dewatered and/or dried to create a nutrient rich humus product.

The liquid effluent from the biomass concentrating means 89 is directed via stream 101 to a solids clarifier 104 for further concentration of the solids. Concentrated biomass sludge from the solids clarifier is directed via stream 108 back to the influent end of the microorganism growth managing and enhancing unit 79 to maintain biomass quantity therein. The liquid effluent from the solids clarifier could either be used as flushing or wash water directed back via stream 110 to the barn, penning area or the like 75, and/or it could be discharged from the system via stream 114 as a nutrient rich aqueous fertilizer for crops and/or it could be directed via stream 118 for further treatment prior to reuse or ultimate surface discharge into a wetland or water body, or by subsurface discharge to an underground aquifer, via stream 130.

The system parameters, specifically the biomass and dissolved oxygen concentration are maintained in the microorganism growth managing and enhancing unit 79, the biomass concentrating means 89 and the clarifier 104 in this embodiment.

Another embodiment of the invention includes further treatment for clarified, settled, or separated effluent in an additional microorganism growth managing and enhancing unit 120. The microorganism growth managing and enhancing unit effluent is directed, via stream 122, for such treatment by means of a polishing unit 124. The liquid effluent from a polishing unit is sufficiently treated for recycle, reuse or discharge to a created, restored, enhanced, or constructed wetland or surface or subsurface water body via stream 130.

The nutrient rich humus of the invention is a microorganism active by-product of the biomass concentrating means 89, solids mixer 95 and/or polishing unit 124 via stream 126.

Alternately, conventional wastewater treatment processes could be used to further treat the stream discharged from the solids clarifier 104 via stream 118, or from the additional microorganism growth managing and enhancing unit 120 via stream 122, to the quality desired before recycle, reuse or discharge 130.

The process of the invention can also be modified to increase the amount of nutrients converted from soluble to particulate form. The addition of an anaerobic zone or sub-zone wherein oxygen is not added, with periodic or continual recycling of all or a portion of the contents of the process through this anaerobic zone or sub-zone, can result in an increase in the conversion of soluble phosphorus within the organic waste stream into particulate form. The addition of an anaerobic zone or sub-zone, in conjunction with the other process parameters, subjects the microorganisms to certain environmental conditions that can result in an increase in the conversion of soluble phosphorus within the organic waste stream into particulate form.

The process of the invention can then be further modified by removing the anaerobic zone or sub-zone after the Bio-P functionality is established as evidenced by particulate phosphorus concentrations. Surprisingly, the phosphate accumulating/conversion ability of the microorganisms continues despite the absence of a discretely defined anaerobic zone or sub-zone.

Figure 4:
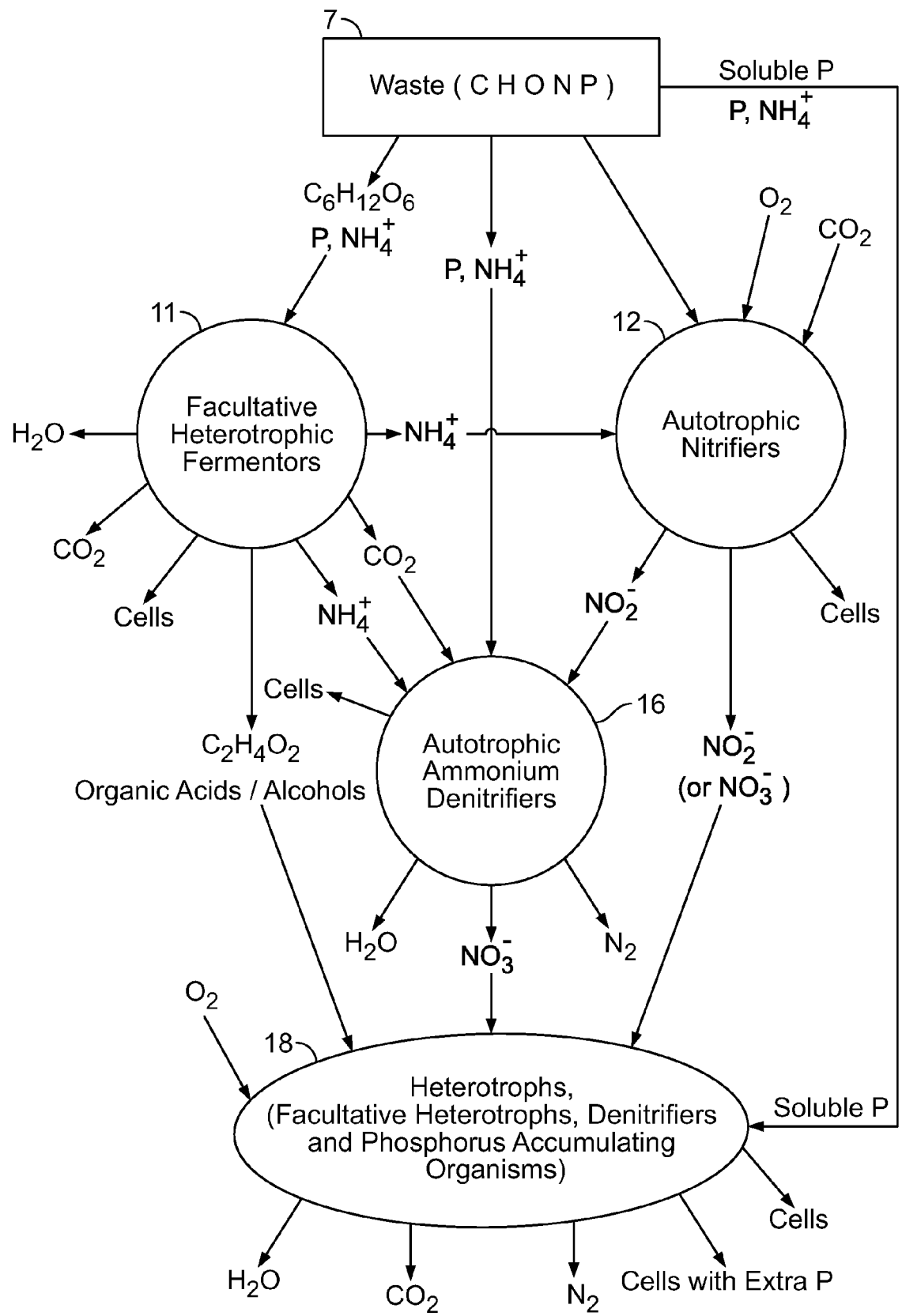
FIG. 4 comprises a schematic illustrating the predominant interrelationships of the organic waste, the major microbial groups responsible for biologically mediated conversion, the intermediate breakdown substances, and the final products of the process of the invention with increased phosphorus removal.

With reference to FIG. 4, populations of facultative heterotrophic fermentors 11 will thrive on the organic wastes 7 available, while the growth of obligate aerobes and obligate anaerobes, that might otherwise be expected to compete for the carbon and energy sources, are suppressed in the micro-electron acceptor environment by the very low dissolved oxygen concentrations maintained. There will generally be enough oxygen available in the micro-electron acceptor environment to inhibit obligate anaerobes but not enough to allow the obligate aerobes to be competitive. By adding an anaerobic zone or sub-zone and then subsequently removing or eliminating such zones or zone, conditions will favor the persistence and development of appropriately induced and maintained microbial populations with the micro-electron acceptor phosphorus accumulating capability without the need for a physically defined anaerobic environment. Most of these MEAPAOs, a subset of PAOs, will be facultative heterotrophic denitrifiers but some obligate aerobic MEAPAOs may be included as well. The MEAPAOs have the unique and novel ability to thrive and function in the micro-electron acceptor environment.

Similar to the description for FIG. 1, the low oxygen concentration in the micro-electron acceptor environment induces the facultative heterotrophs to shift from an oxidative metabolism to a fermentative metabolism. Thus, the facultative heterotrophic fermentors 11 ferment the organics present to organic acids and/or alcohols instead of oxidizing them through oxidative phosphorylation to carbon dioxide and water.

In the process of the invention with MEAPAOs present, the oxygen introduced into the process is taken up by the autotrophic nitrifiers 12 to nitrify, generally by oxidizing to nitrite ($NO_2^-$) and/or nitrate ($NO_3^-$), the nitrogen containing compounds in the system. Since the oxygen introduced into the process of the present invention appears to be readily taken up by autotrophic nitrifier 12 populations, simplified control systems can be used to control oxygen loading to promote nitrification in a low dissolved oxygen process, without promoting the competing growth of obligate aerobes and facultative heterotrophic microorganisms using oxidative phosphorylation. The desired dissolved oxygen concentration for the process of the present invention is below the point where the organisms using facultative fermentative pathways start to predominate over organisms using oxidative pathways. Applicants have found this dissolved oxygen concentration is less than about 2.0 mg/L and preferably, is less than about 0.1 mg/L.

Generally oxygen present in the process in excess of the requirements for nitrification by the autotrophic nitrifiers 12 will be used preferentially to support heterotrophic aerobic activity. Normally heterotrophic aerobic activity will be done by facultative heterotrophs, but may in some cases involve obligate aerobes as well. Within limits, the scavenging action of these heterotrophic aerobes removes the excess oxygen and maintains the present invention's oxygen concentration at very low levels. With the addition or development of MEAPAOs for increased phosphorus removal, Applicants believe that to the extent present, a significant portion of the heterotrophic aerobes in the process are PAOs capable of (i) competing with and establishing a competitive advantage over the other oxygen utilizing microbial organisms for a portion of the excess dissolved oxygen and (ii) absorbing additional phosphorus.

The process of the present invention is also believed to establish a population of heterotrophs, including facultative heterotrophs, denitrifiers (including MEAPAO denitrifiers) and MEAPAOs 18. The MEAPAO denitrifiers and non-PAO denitrifiers use the $NO_2^-$ and/or $NO_3^-$ produced by the autotrophic nitrifiers 12 as their electron acceptor instead of dissolved oxygen. These denitrifying heterotrophs 18 then convert the organic acids and alcohols produced by the facultative heterotrophic fermentors 11 and other waste stream organics present into $CO_2$ and $H_2O$ while reducing the $NO_2^-$ and/or $NO_3^-$ nitrogen to $N_2$. Sustaining low oxygen concentrations outside the anaerobic zone or sub-zone that are high enough to concurrently allow the autotrophic nitrifiers 12 to thrive and nitrify ammonium ($NH_4^+$) to $NO_2^-$ and/or $NO_3^-$ and low enough to establish populations of facultative heterotrophs able to reduce $NO_2^-$ and/or $NO_3^-$ to $N_2$ is of benefit to the current invention.

This process also allows the establishment of autotrophic ammonium denitrifiers 16 capable of using $NO_2^-$ to oxidize $NH_4^+$ to $N_2$ and a small portion of $NO_3^-$ in reducing $CO_2$ to cell material (biomass).

Application of this concurrent or simultaneous nitrification and denitrification process results in a nutrient rich humus material made by a process for the substantially odorless biological treatment of solid and liquid organic wastes, particularly animal farm wastes.

Thus, referring to FIG. 4, Applicants have found that controlling the amount of oxygen introduced into a biological treatment process comprising a waste stream 7 having a relatively high concentration of TKN and total BOD in a ratio of more than about 1:20 provides a strong niche for facultative heterotrophic denitrifiers 18. In addition, by temporarily adding an anaerobic zone or sub-zone with recycle, a strong niche is also created and maintained for the development of heterotrophic PAOs and subsequently, upon removal of the anaerobic zone or sub-zone, development of the MEAPAOs 18, particularly for waste streams with a relatively high P/N ratio of about 0.16, and sometimes as high as about 0.30 to 0.50 or higher. Once the MEAPAOs are developed, removal of the anaerobic zone or sub-zone does not remove the MEAPAO functionality as long as the low electron acceptor environment is maintained.

The organic acids and/or alcohols produced by the facultative heterotrophic fermentors 11, together with other organics present in the waste stream and dead microbial cells or cell fragments, will efficiently combine with the nitrite and/or nitrate produced by the autotrophic nitrifiers 12 to provide this strong niche for heterotrophs 18 and autotrophic ammonium denitrifiers 16. The denitrifying heterotrophs 18 in turn denitrify the nitrite and/or nitrate to nitrogen gas while the autotrophic ammonium denitrifiers 16 oxidize $NH_4^+$ to $N_2$ as well and return $NO_3^-$ to the denitrifying heterotrophs 18. Ultimately, the organic waste is converted to $N_2$, $CO_2$, $H_2O$, clean water, and beneficial soil, and perhaps feed products. The low oxygen biologically mediated conversion process of the present invention, therefore, provides for substantially odorless, efficient, treatment of organic waste. With MEAPAOs present in the system, the amount of phosphorus converted to particulate form most likely increases.

Figure 5:
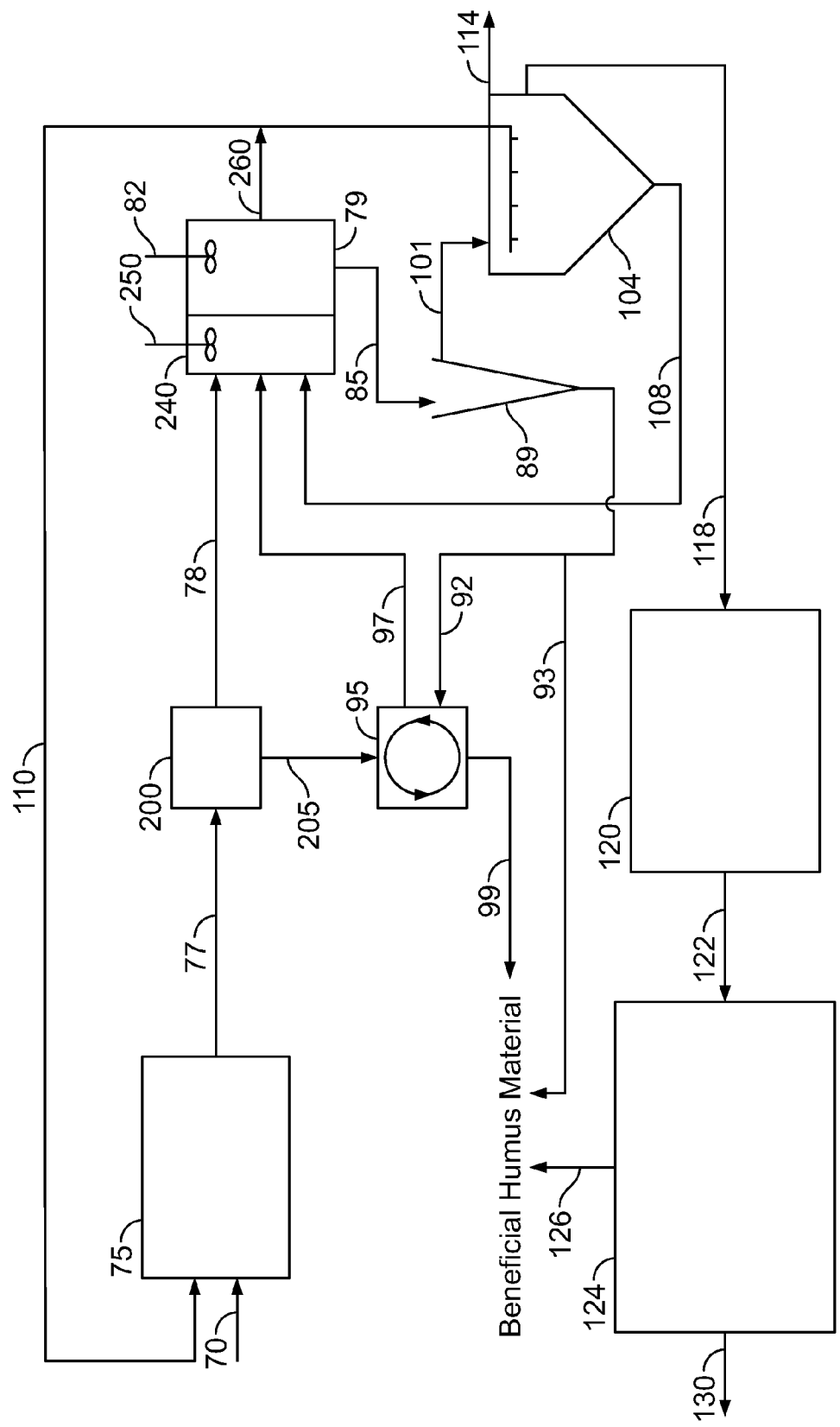
FIG. 5 comprises a flow diagram of another embodiment of the process of the invention for a higher rate dairy farm system with increased phosphorus removal utilizing a temporary/removable anaerobic zone or sub-zone FIG. 6 comprises a flow diagram of another embodiment of the process of the invention for a higher rate dairy farm system with increased phosphorus removal with the temporary/removable anaerobic zone or sub-zone removed from the process.

As shown in FIG. 5, wash water, liquid wastewaters 70 and/or recycled flushing water 110 are passed through an animal confining barn, penning area or the like 75. The slurried animal excrement waste is directed to a solids separating means 200, to separate cellulosic solids and other course organic and inorganic solids from soluble and finely suspended solids. In the embodiment of the invention shown in FIG. 5, the separated stream is then directed to a temporary/removable anaerobic zone or sub-zone 240 via stream 78 wherein a means of mixing 250 that could include some type of mechanical mixers, pumps, and the like, is used absent oxygen addition. The anaerobic zone or sub-zone 240 induces quantities of soluble phosphorus to be converted into particulate form in the microorganism growth managing and enhancing unit 79 due to the unique quantities and distribution of microbial organisms in the process. PAOs in the anaerobic zone or sub-zone 240 encounter conditions in which they will use energy stored in polyphosphate, thereby decreasing their polyphosphate stores, and will accumulate acetate or other volatile fatty acids, storing these compounds in polymer form, usually as polyhydroxybuteric acid.

The stream is then directed to a microorganism growth managing and enhancing unit 79 wherein microbes are grown, enhanced, modified and/or concentrated, and wherein quantities of soluble phosphorus are converted into particulate form due to the unique quantities and distribution of microbial organisms in the process. PAOs in the microorganism growth managing and enhancing unit 79 oxidize the stored organic polymers and other energy sources using electron acceptors and use the energy to form energy rich polyphosphate. The polyphosphate is stored so that the energy it contains may be used when anaerobic conditions recur, which allows the PAOs to displace or viably compete with other heterotrophic microorganisms that can not take advantage of the stored energy to thrive under anaerobic conditions. This relative energy advantage in the anaerobic environment provided by the temporary/removable anaerobic zone or sub-zone 240 leads to the dominance of PAOs over other non-phosphate accumulating organisms which utilize oxygen as an electron acceptor.

The microbial organisms induce an environment favorable to the incorporation of soluble phosphorus into complexes which may include microbial cells, chemical precipitates, complexes and/or aggregates of cells, precipitates and/or other insoluble materials, such that the soluble phosphorus is captured in such aggregates and can then be removed as harvested humus material leading to an effluent from the biologically mediated conversion process which is low in soluble phosphorus. If this biomass is then removed from the microorganism growth managing and enhancing unit 79 before the anaerobic zone or sub-zone 240 is encountered again, the phosphorus is removed from the system. The expected increase in the phosphorus content of the resultant biomass and sludge reduces effluent phosphorus discharges.

Figure 6:
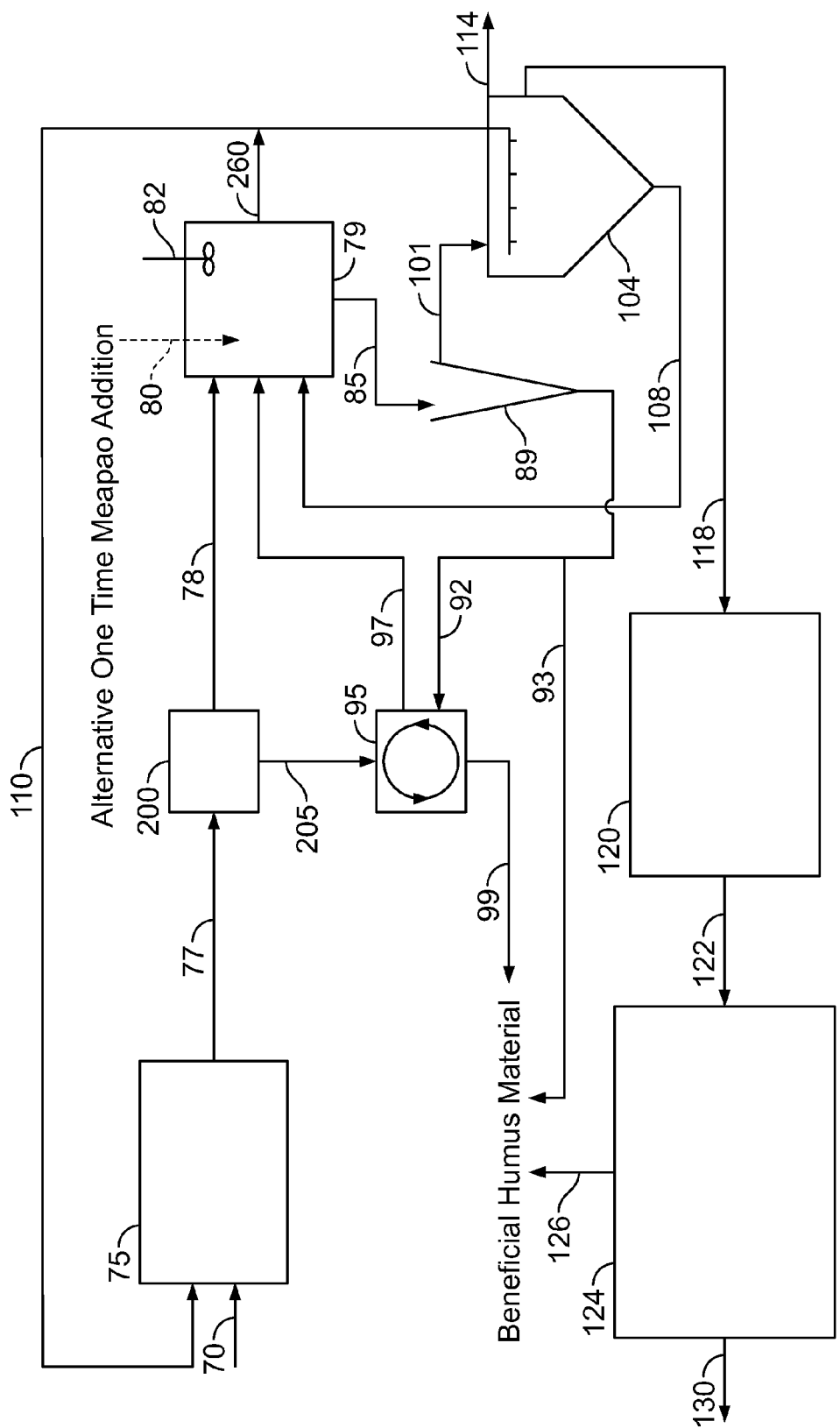
FIG. 6 also comprises a flow diagram of another embodiment of the process of the invention for a higher rate dairy farm system with increased phosphorus removal with MEAPAO seeding.

Once a significant portion of the microbes in this process have developed, the temporary/removable anaerobic zone or sub-zone 240 can be removed. FIG. 6 shows the process of FIG. 5 without the temporary/removable anaerobic zone or sub-zone. Once this removal of the anaerobic zone has occurred the MEAPAOs will perform the periodic and cyclical Bio-P functionality. However, in the absence of a large and well defined anaerobic zone this increased phosphorus conversion is believed to occur as a response to small local variations in the concentrations of electron acceptors relative to the individual MEAPAOs. The MEAPAOs will thus continually shift back and forth from polyphosphate accumulation accompanied with PHB utilization mode to the polyphosphate utilization accompanied with PHB synthesis mode in response to small variations in the concentrations of electron acceptors in the local environment close to the microbe itself. The dimensions of these local environments may be as small as to be within a few microns of the surface of the microbe itself.

The cyclical functionality of the MEAPAOs just described are believed to persist in a configuration as shown in FIG. 6 whether this functionality was generated as described relative to FIG. 5 in which an anaerobic zone was initially present and then was subsequently removed, or whether this functionality was derived from the addition of a population(s) of MEAPAOs without ever adding a discretely defined anaerobic zone or sub-zone to the process.

In the embodiments of the invention shown in FIG. 5 and FIG. 6, the coarse, mostly cellulosic solids, removed by the solids separating means 200, are delivered by stream 205 to a mixer 95 for further processing or may be removed from the system for other uses.

The dissolved oxygen concentration and the amount of microorganisms in the micro-electron acceptor portion of the process stream are monitored for compliance with process parameters, specifically low dissolved oxygen and high microorganism quantity. Dissolved oxygen concentrations are controlled by means of aeration unit 82 that could include a dissolved oxygen aeration system, some type of mechanical mixers, submerged compressed air diffusers or the like. The biomass quantity in the system is maintained by concentrating and recycling the effluent from the microorganism growth managing and enhancing unit 79.

The treated microorganism growth managing and enhancing unit liquid effluent stream 85 is directed to a biomass concentrating means 89 wherein the biomass is settled, thickened, separated and/or concentrated. Further solids treatment for the concentrated biomass from the biomass concentrating means 89 is achieved by directing the solids via stream 92 to a solids mixer 95. Alternatively, these solids may be harvested via stream 93 for use as soil for plant growth product additives, or for feed and food stocks or raw materials for such processed stocks. The solids mixer 95 mixes the concentrated biomass from the biomass concentrating means 89 delivered to it via stream 92, with the cellulosic and other course solids separated from stream 77 by the solids separator 200 that is delivered to the mixer via stream 205. Excess liquid is directed back to the microorganism growth managing and enhancing unit 79 via stream 97 and the mixed solids are removed via stream 99 and harvested, dewatered and/or dried to create a nutrient rich humus product.

The liquid effluent from the biomass concentrating means 89 is directed via stream 101 to a solids clarifier 104 for further concentration of the solids. Concentrated biomass sludge from the solids clarifier is directed via stream 108 back to the influent end of either the anaerobic zone 240 (as shown in FIG. 5) or the micro-aerobic zone 79 (as shown in FIG. 6) to maintain biomass quantity therein. The liquid effluent from the solids clarifier could either be used as flushing or wash water directed back via stream 110 to the barn, penning area or the like 75, and/or it could be discharged from the system via stream 114 as a nutrient rich aqueous fertilizer for crops and/or it could be directed via stream 118 for further treatment and/or storage prior to reuse or ultimate surface discharge into a wetland or water body, or by subsurface discharge to an underground aquifer, via stream 130.

The system parameters, specifically the biomass and dissolved oxygen concentration, are maintained in the microorganism growth managing and enhancing unit 79, the biomass concentrating means 89 and the clarifier 104 in this embodiment.

In another embodiment, further treatment and/or storage for clarified, settled, or separated effluent can occur in an additional microorganism growth managing and enhancing unit 120. The microorganism growth managing and enhancing unit effluent is directed, via stream 122, for final polishing by means of a polishing unit 124. The liquid effluent from a polishing unit is sufficiently treated for recycle, reuse or discharge to a created, restored, enhanced, or constructed wetland or surface or subsurface water body via stream 130.

The nutrient rich humus of the invention is a microorganism active by-product of the biomass concentrating means 89, solids mixer 95 and/or polishing unit 124 via stream 126.

Alternately, conventional wastewater treatment processes could be used to further treat the stream discharged from the solids clarifier 104 via stream 118, or from the additional microorganism growth managing and enhancing unit 120 via stream 122, to the quality desired before recycle, reuse or discharge 130.

In another embodiment of the invention the addition (seeding) of an appropriate population of MEAPAOs into a micro-electron acceptor environment of the process with high levels of nitrogen and phosphorus can lead to the presence, persistence, and further development of the Bio-P capability. An example of this embodiment is also represented by the process shown in FIG. 6, wherein the MEAPAOs 80 are added to the microorganism growth managing and enhancing unit 79. Although the preferred mode of operation is to add the MEAPAOs to unit 79, the MEAPAOs can be added anywhere in the process of the invention in liquid or solids form.

In other embodiments of the invention, the temporary/removable anaerobic zone or sub-zone may be located in other parts of the process, such as before, after or within the microorganism growth managing and enhancing unit 79, as long as part or all of the liquid contained in the micro-electron acceptor environment is periodically recycled through the anaerobic zone or sub-zone. Preferably, the temporary/removable anaerobic zone or sub-zone is located before or at the beginning of the microorganism growth managing and enhancing unit 79.

In a further embodiment of the invention, it is believed that the development of MEAPAOs can be achieved and sustained by subjecting waste streams with a relatively high P/N ratio of about 0.16, and sometimes as high as about 0.30 to 0.50 or higher to the process according to the present invention without seeding and without a temporary anaerobic environment. Instead, it is believed that the MEAPAO populations gradually evolve and adapt through the cyclical variation of the local electron acceptor concentrations in a low electron acceptor environment leading to the presence, persistence, and further development of the Bio-P functionality.

Figure 7:
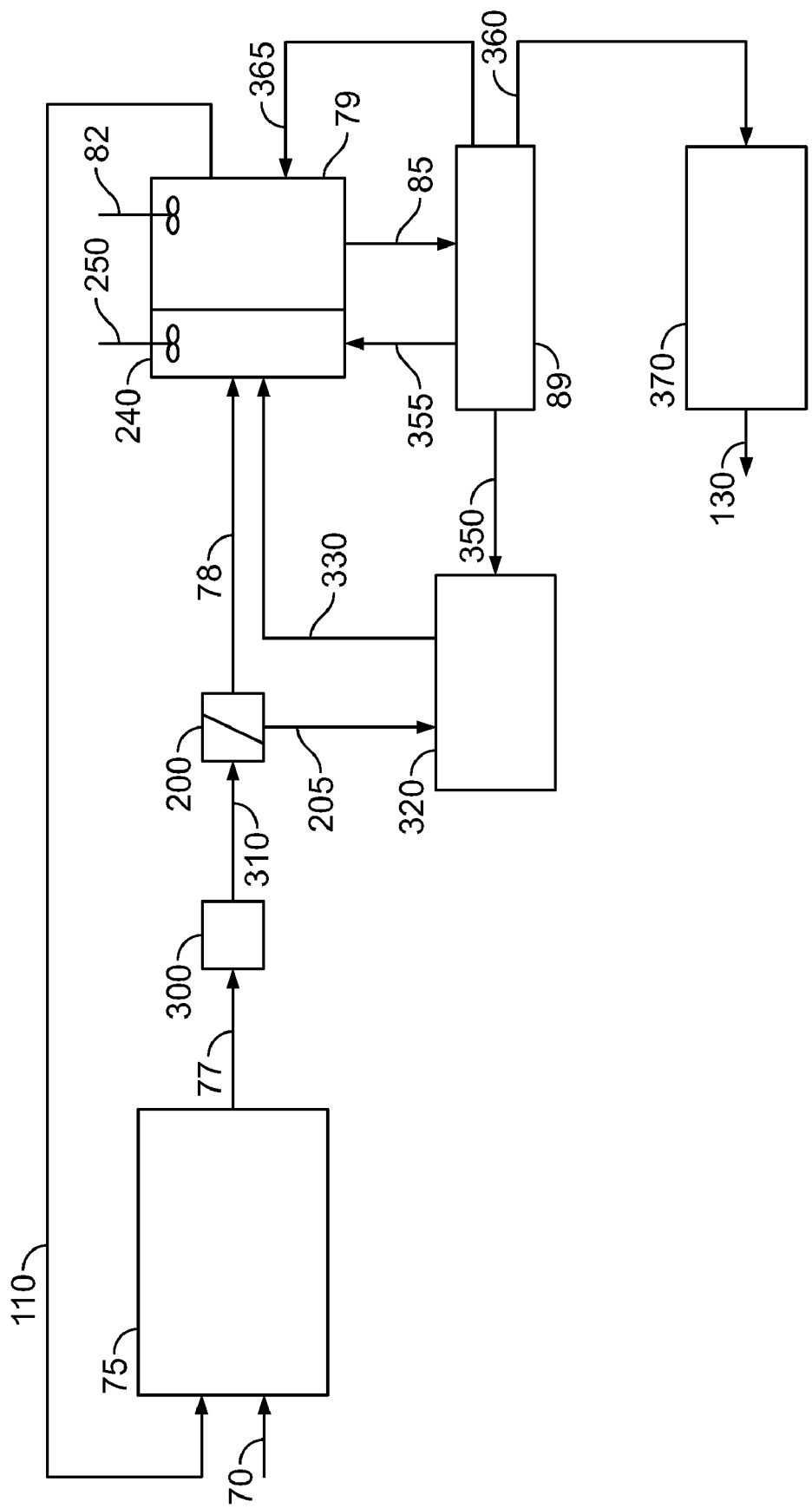
FIG. 7 comprises a flow diagram of another embodiment of the process of the invention for a higher rate dairy farm system with increased phosphorus removal utilizing a temporary/removable anaerobic zone or sub-zone.

As shown in FIG. 7 wash water, liquid wastewaters 70 and/or recycled flushing water 110 are passed through an animal confining barn, penning area or the like 75. The slurried animal excrement waste is directed via stream 77 to a contact mixing chamber 300 wherein all flushed or received wastes are mixed. The mixed wastes are then directed via 310 to a solids separating means 200, to separate cellulosic solids and other coarse organic and inorganic solids from soluble and finely suspended solids. The separated stream is then directed via stream 78 to a micro-electron acceptor environment 79, which may contain a temporary/removable anaerobic zone or sub-zone, 240. Both the temporary/removable anaerobic zone or sub-zone 240 and the micro-electron acceptor environment 79 may contain a means of mixing or aeration units 250 and 82, that could include some type of mechanical mixers, pumps, and the like. The temporary/removable anaerobic zone or sub-zone 240 induces PAOs and MEAPAOs which cause quantities of soluble phosphorus to be converted into particulate form in the microorganism growth managing and enhancing unit 79 due to the unique quantities and distribution of the PAO and MEAPAO microbial organisms PAOs in the temporary/removable anaerobic zone or sub-zone 240 encounter conditions in which they will use energy stored in polyphosphate, thereby decreasing their polyphosphate stores, and will accumulate acetate or other volatile fatty acids, storing these compounds in polymer form, usually as polyhydroxybuteric acid.

The stream is then directed to a microorganism growth managing and enhancing unit 79 wherein microbes are grown, enhanced, modified and/or concentrated, and wherein quantities of soluble phosphorus are converted into particulate form due to the unique quantities and distribution of microbial organisms in the process. PAOs and MEAPAOs in the microorganism growth managing and enhancing unit 79 oxidize the stored organic polymers and other energy sources using electron acceptors and use the energy to form energy rich polyphosphate. The polyphosphate is stored so that the energy it contains may be used when anaerobic conditions recur, which allows the PAOs to displace or viably compete with other heterotrophic microorganisms that can not take advantage of the stored energy to thrive under anaerobic conditions. This relative energy advantage in the anaerobic environment provided by the temporary/removable anaerobic zone or sub-zone 240 leads to the dominance of PAOs over other phosphate uptake organisms which utilize oxygen as an electron acceptor.

The microbial organisms induce an environment favorable to the incorporation of soluble phosphorus into complexes which may include microbial cells, chemical precipitates, complexes and/or aggregates of cells, precipitates and/or other insoluble materials, such that the soluble phosphorus is captured in such aggregates and can then be removed as harvested humus material leading to an effluent from the biologically mediated conversion process which is low in soluble phosphorus. If this biomass is then removed from the microorganism growth managing and enhancing unit 79 before the temporary/removable anaerobic zone or sub-zone 240 is encountered again, the phosphorus is removed from the system. The expected increase in the phosphorus content of the resultant biomass and sludge reduces effluent phosphorus discharges.

Figure 8:
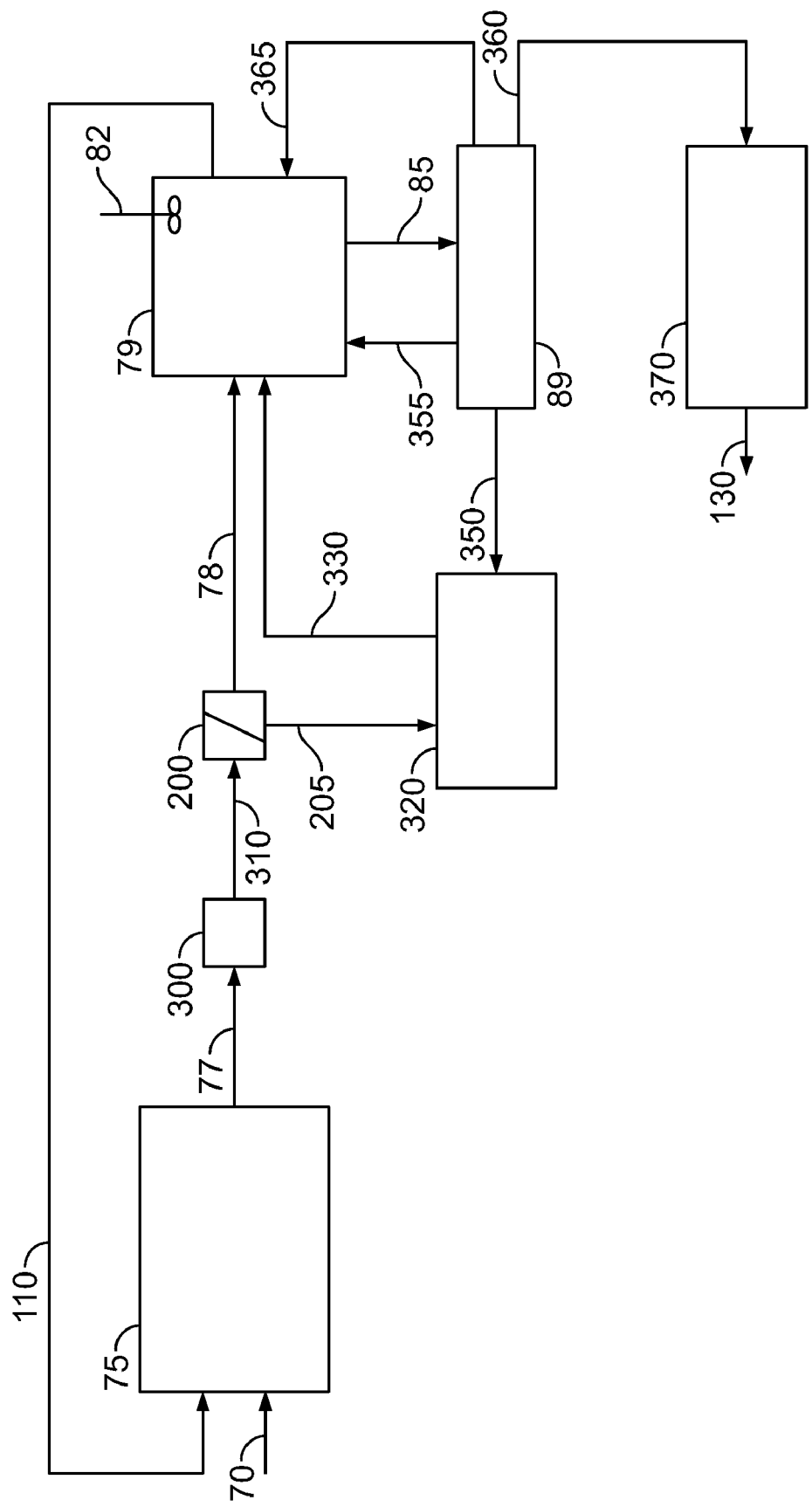
FIG. 8 comprises a flow diagram of another embodiment of the process of the invention for a higher rate dairy farm system with increased phosphorus removal.

Once the Bio-P functionality has been developed, the temporary/removable anaerobic zone or sub-zone 240 may be removed from the process to give a configuration as shown in FIG. 8. This configuration would also apply in the case where MEAPAO populations are added to the treatment system or to the case where the MEAPAO populations gradually evolved through the cyclical variation of the local electron acceptor concentrations in the low electron acceptor environment. In these cases, the MEAPAO populations will continue to exhibit the Bio-P functionality induced by variations in the local low electron acceptor concentrations. However, in the absence of a large and well defined anaerobic zone this phenomena will now occur as a response to the small local variations in the concentrations of electron acceptors relative to the individual MEAPAO organisms.

In FIG. 8, the MEAPAO populations in microorganism growth managing and enhancing unit 79 will exhibit the enhanced Bio-P uptake behavior just described independent of whether the MEAPAO populations were generated: (i) when certain environmental conditions are added to induce certain microorganism abilities and then such combinations are removed; (ii) when certain microbial populations having induced abilities are added, or (iii) when the low concentrations of electron acceptors are varied in local zones of a large environment containing relatively high phosphorus to nitrogen ratios (greater than about 0.16 and as high as about 0.3 to 0.5).

The coarse, mostly cellulosic solids, removed by the solids separating means 200 in FIG. 7 are delivered by stream 205 to a solids processing system 320 wherein solids maybe dried, composted, heat processed or the like, or wherein the solids are land applied. Solids from the solids processing system 320 can also be directed via stream 330 to the anaerobic zone or sub-zone 240 for further treatment in the process.

The dissolved oxygen concentration and the amount of microorganisms in the micro-electron acceptor portion of the process stream are monitored for compliance with process parameters, specifically low dissolved oxygen and high microorganism quantity. Dissolved oxygen concentrations are controlled by means of mixing or aeration unit 82 that could include a dissolved oxygen aeration system, some type of mechanical mixers, submerged compressed air difussers or the like. The biomass quantity in the system is maintained by concentrating and recycling the effluent from the microorganism growth managing and enhancing unit 79.

The treated microorganism growth managing and enhancing unit liquid effluent stream 85 is directed to a biomass concentrating means 89 wherein the biomass is settled, thickened, separated and/or concentrated. Further solids treatment for the concentrated biomass from the biomass concentrating means 89 is achieved by directing the solids via stream 350 to solids treatment system 320 wherein solids may be thickened, dried, heated, sterilized, composted or otherwise processed for use as humus material, feeds or feed supplements. Alternatively, these solids may be delivered via stream 355 to the anaerobic zone or sub-zone 240 or via stream 365 to the microorganism growth managing and enhancing unit 79, to control biomass concentrations.

Alternatively, the concentrated biomass from the biomass concentrating means 89 can be directed via stream 360 to solids storage unit 370 for ultimate disposal on land or by other means 130.

The system parameters, specifically the biomass and dissolved oxygen concentration are maintained in the microorganism growth managing and enhancing unit 79 and the biomass concentrating means 89 in this embodiment.

The nutrient rich humus material of the invention is a microorganism active by-product from the biomass concentrating means 89.

Alternately, conventional wastewater treatment processes could be used to further treat the stream discharged from the biomass concentrating means 89 via stream 360 to the quality desired before recycle, reuse or discharge 130.

In other embodiments of the invention, the temporary/removable anaerobic zone or sub-zone 240 may be located in other parts of the process, such as before, after or within the microorganism growth managing and enhancing unit 79, as long as part or all of the liquid contained in the micro-electron acceptor environment is periodically recycled through the anaerobic zone or sub-zone during the MEAPAO development period. Preferably, the temporary/removable anaerobic zone or sub-zone 240 is located before or at the beginning of the microorganism growth managing and enhancing unit 79.

The process of the invention could be further modified for other applications. For example, a standard hog farm system according to the present invention might advantageously incorporate an additional microorganism growth managing and enhancing unit in between the barn and the solids concentrating unit.

A process of the present invention may include a chemical addition/mixing sub-zone within a microorganism growth managing and enhancing unit or positioned in one or more cells of a solids concentrating treatment unit 79. Such a sub-zone could be positioned for mixing in chemicals that could be added to the process of the invention to essentially chemically perform the role of the facultative heterotrophic fermentors and/or for mixing in metallic salts or organic polymers for the removal of precipitable phosphorus and other materials. Preferably, such a sub-zone is positioned at the influent end of a microorganism growth managing and enhancing unit 79 or biomass concentrating means 89. In such an embodiment, although the facultative heterotrophic fermentors would still be present in the process of the invention, albeit in smaller quantities, chemicals can be added to the process of the invention to supply an energy source for the facultative heterotrophic denitrifiers. For example, acetic acid, methanol, or other organic acids or alcohols could be used. Preferred metallic salts for this purpose include ferrous sulfate, ferric chloride, alum and the like which can combine with suspended and/or solubilized phosphorus compounds to form a precipitate and/or associated chemical complexes.

In another embodiment, a system using the process of the invention may have one or a series of closed vessels, the vessels being initially loaded with a microbial population of about $10^{15}$ microbes or more, and being in fluid communication with an influent aqueous waste stream having a concentration of total BOD and a ratio of TKN:total BOD of more than about 1:20. The vessel includes means for delivery of oxygen thereto, preferably comprising a combined mechanical mixing and aeration means, arranged to be automatically enabled as desired.

The process of the present invention could further comprise a plurality of sensing means, arranged to sense dissolved oxygen and/or oxygen loading, biomass and/or influent stream temperature and rates of influent flow, each being interconnected to a central processing unit. Sensing means, for example, may include oxidation/reduction potential (redox), pH, conductivity, temperature and/or combinations thereof alone or together with other sensors, which enable data indicative of dissolve oxygen concentration and/or availability. Other sensing means which relate to the functionality, stability, and/or performance of the systems as a whole or the microbial biomass, may also be used in the process of the invention. These might include liquid sensors, such as specific ion electrodes for a variety of ions including ammonium ions, and gas sensors which could detect ammonia and other nitrogen containing gaseous compounds, hydrogen sulfide, mercaptans, and a variety of volatile organic compounds such as the acetic, butyric, and propionic acids commonly associated with ruminant manures.

A central processing unit such as a computer, typically comprising micro-controller means, data distribution means, data storage means and comparator/computing means may be used. Data from at least one or a plurality of sensing means is typically routed to the micro-controller means, wherein it is digitized for use by the central processing unit and provided to the distribution means for distribution to the comparator/computing means and/or data storage means. The comparator/computing means generally compares data received from the distribution means with previously stored data and analyzes, computes and/or confirms system parameters within the biomass, thereby enabling, disabling or varying oxygen loading and/or mixing and/or recycle flows and/or influent waste stream flow in accord with preset and/or continually calculated system parameters. A monitor and/or printer provides visual and/or hard copy confirmation of status and the central processing unit may be interconnected to a remote station to enable remote monitoring and remote system modification as desired.

In a further preferred embodiment, a vessel will automatically discharge suitably bioconverted product for subsequent processing and retain an appropriate quantity of biomass containing the appropriate mass of microbes for managed treatment of the aqueous influent stream.

The efficiency of the process of the present invention is best described by example. In a typical wastewater application of the present invention, 100 pounds of TKN and 260 pounds of total BOD can be treated with 260 pounds of oxygen, to produce 105 pounds of cells while discharging essentially no TKN in the effluent and predominately discharging $N_2$ and $CO_2$ to the atmosphere. In comparison, an advanced wastewater treatment plant using costly energy intensive nitrogen removal technology would require more than 600 pounds of oxygen to achieve the same discharge criteria. In further comparison, a conventional secondary treatment wastewater plant, would use about the same 260 lbs. of oxygen as the process of the invention, just to treat the BOD, while a significant part of the influent TKN nitrogen would be discharged to the atmosphere as ammonia gas, with most of the remainder of TKN being discharged in the effluent stream as ammonium ions and TKN.

The process of the present invention is applicable to multiple diverse wastewater streams. For example, the process is applicable to municipal wastewater streams containing a total BOD of about 100 to about 400 mg/L, a TKN of about 10 to about 70 mg/L and a total Phosphorus of about 4 to about 15 mg/L; to flushed wastewater from a hog, dairy and/or other animal holding area having a total BOD of about 500 to about 16,000 mg/L, a TKN of about 100 to about 3,000 mg/L and a total Phosphorus of about 30 to about 2,500 mg/L; and industrial, food processing and the like wastewater having a total BOD of about 400 to about 80,000 mg/L and a TKN of about 20 to about 10,000 mg/L. Additional application areas include the production of a microbial cell mass for single cell protein production from a variety of biodegradable materials, e.g. solid and/or waterborne, and appropriate nitrogen sources.

The nutrient rich humus of the invention is a settled and in some cases precipitated, microorganism active-product of the process. The humus comprises bioconverted organic waste containing stable nitrogen, phosphorus and potassium rich material, bound in an active microorganism matrix intermixed with fibrous cellulosic and/or other organic materials. The appearance of dried humus varies significantly from dried manure in that it is a deep brown, peat like or granular material, which readily mixes with soil, including clay, sand and the like. The material is substantially generally absent an offensive odor and has limited odor that is closely similar to that of rich topsoil. The material may be comminuted (ground, granulated, screened, milled) and generally contains few clumps. The material is generally hydrophobic in that it resists wetting, but once wetted it becomes hydrophilic in that it tends to hold water. The material appears to resist clumping even when wetted.

A preferred humus of the invention, without provision for increased phosphorus removal, comprises from about 0.2 to about 6.0% nitrogen, about 0.1 to about 2.0% phosphorus and from about 0.1 to about 2.0% potassium on a dry weight basis, in stable form. The use of chemical precipitation and high rate processing can raise the nitrogen, phosphorus and potassium upper limits to about 10% on a dry weight basis.

A more preferred humus of the invention, with increased phosphorus removal, comprises from about 0.2 to about 12.0% nitrogen, about 0.1 to about 14.0% phosphorus and from about 0.1 to about 4.0% potassium on a dry weight basis, in stable form. The use of chemical precipitation and high rate processing can raise the nitrogen, phosphorus and potassium upper limits.

Though unstable nitrogen and phosphorus values are generally present in the humus of the invention, they appear to be in quantities so low as to constitute little or no environmental threat through aqueous dissolution and run-off, but are available for uptake by plants. Thus, the humus of the invention is unique in that the nitrogen and phosphorus nutrient rich character thereof is in a form beneficial for enhancing the growth of vegetation within its environment, yet resistant to migration by rainfall, ground water flow and the like to pollution of aquifer, surface and groundwater accumulations.

The humus of the invention created from animal excrement could comprise other components which are defined by the animal feed supply, the animal from which the humus is generated, any bedding, parlor washwaters, cleaners, run-off and the like, or other materials which may be collected or added to the system for humus generation. Such other added components are synergistic and are intended to improve the efficacy of a particular humus of the invention for a particular use.

The organic matrix of the humus of the invention is rich in stabilized nutrient content and comprises dynamic macro and/or micro organisms and other components which appear especially predisposed to proactively adapt and interact with additive materials in an efficacious phenomena which can be managed to provide a host of further beneficial products.

Due to the maintenance of the process parameters in the desired ranges, a consistent quality of humus can be obtained. Waste may be collected from any convenient organic waste source such as dairy cows, sheep, goats and the like, feed lot cattle, swine, horses, zoo animals, poultry including chicken, turkeys, ducks and the like and even aquatic animals such as fish, frogs and alligators.

The process of the invention is managed to maximize the active, facultative heterotrophic and autotrophic biomass by continually generating genetic variations in its organisms to optimize microbial adaptability of the biomass to survive and thrive in varying environments. The humus harvested has an active microbial potential that appears to adapt to environmental changes with a host of interesting beneficial effects. Thus, the humus of the invention, which comprises captured and stabilized nutrients along with trace metals, appears to adapt and capture toxic substrates or trace metals when produced from or mixed with a waste stream containing same. Microbial variations which appear to degrade cellulose and lignin are enhanced by microbial variations which appear to degrade other polymerized materials. Microbial variations which appear to capture and stabilize nutrients are enhanced by microbial variations which appear to promote seed germination and release of nutrients which increase crop yield and size of fruits, grains and vegetables.

The humus of the invention is generally processed after harvesting for both convenience of handling and enhancement of microbial activity. Generally, the humus of the invention is at least partially dried to reduce its handling weight by air drying, vacuum water removal, mild heat drying or the like and thereafter shredded, screened, pulverized or the like as may be desired. It is also possible to use other drying processes or techniques such as intense heat drying, forced air, or cyclonic drying. It should be understood however, that the humus of the invention need not be dried or further comminuted to be effective as a beneficial product in accord with the invention.

Partially dried and processed humus is easily mixed with other materials and has been found to be especially effective in providing an enhanced growth media when mixed with normal soils and top soils.

The humus of the invention can also be effective in producing remediated growth soil media when mixed with clay, sand, silt, mud, soil, gravel, dust, mine tailings, dredge materials, depleted or spent soils and the like. New growth media can be created through mixtures of the humus with sawdust, paper, cardboard, polymers, plastics, waste organics or agricultural materials such as bagasse, hulls, stalks, stems, waste hay, leaves, shells, cotton or rayon dust and the like.

It is contemplated that the humus of the invention can also be used in aquatic growth environments wherein the humus alone or mixed as above indicated with other media is added to a flooded environment for plant growth. This could be used for the creation, restoration, or enhancement of wetlands.

Though the humus of the invention provides enhanced nutrient content to promote germination and growth of plants, it has also been found to be effective in suppressing plant disease and providing plant pest resistance. Humus which is harvested direct from the process of the invention is generally too nutrient rich to be a suitable plant growth media standing alone, and is generally mixed with an appropriate material as above described to provide a desirable medium. Interestingly however, such directly harvested humus appears to provide a good top cover for plants which have been seeded or germinated in under soils, appearing to provide resistance to the spread of disease bacteria and the like while providing a rich nutrient source which can be utilized by the root structure of the existing plant.

The humus of the invention can also be an effective feed component. Depending upon the animal source of the waste used to generate the humus of the invention, the humus can be of beneficial utility as a feed stock and/or additive. For example, the humus produced from the waste from typical swine feed lot operations generally comprises protein content which appears to define and characterize a delivery vehicle for nutrients, trace elements and the like for feed stock utility.

Thus, humus generated from barn and manure waste from a trough fed dairy cow or feed lot operation comprises an active organic matrix which may be characterized differently from that of a grazing fed dairy cow operation, which is different from a hog feed lot operation and/or chicken or turkey lot operation. Though each such operation produces a nutrient rich humus which has general applicability for plant growth, each operation also results in a humus containing other components which generally contribute to an individual humus being particularly suitable for specific utilities such as enhanced germination and growth of specific plants and/or remediation of specific soils and/or characterization as foodstuffs or feed additives. The humus of the invention can be modified to achieve specific objectives by introducing various materials into the influent flush waters to the process or into various other components of the process. The nature of the added material and the manner and location of its addition will influence the adaptive and biodynamic character of the process and the resulting humus or other byproduct material. This can be managed to achieve a variety of desirable end product uses and functions.

We claim:

1. A population of MEAPAOs adapted to grow in a cell, tank, pond, or unit containing organic waste, without a physically separated and defined anaerobic environment, wherein oxygen is maintained at less than about 2.0 mg/L of dissolved oxygen, wherein the concentrations of nitrate and nitrite are each less than about 5 mg/L, and wherein said MEAPAOs are capable of increased conversion of at least one nutrient from soluble to particulate form in said cell, tank, pond, or unit.

2. The population of MEAPAOs of claim 1, wherein said MEAPAOs are comprised of populations of facultative heterotrophic fermentors, autotrophic nitrifiers, heterotrophic facultative denitrifiers, heterotrophic PAOs, heterotrophic MEAPAOs, and autotrophic ammonium denitrifiers.

3. The population of MEAPAOs of claim 1, wherein said population of MEAPAOs regenerates at a rate of more than about $10^{15}$ base pair replications per second.

4. The population of MEAPAOs of claim 1, wherein said cell, tank, pond, or unit comprises concentrations of oxygen below about 0.1 mg/L, and nitrate concentrations below about 0.5 mg/L.

5. The population of MEAPAOs of claim 1, wherein said at least one nutrient is phosphorus.

6. The population of MEAPAOs of claim 1, wherein said at least one nutrient is nitrogen.

7. The population of MEAPAOs of claim 1, which further comprises an energy source for the denitrification of nitrite or nitrate by facultative heterotrophic denitrifiers.

8. The population of MEAPAOs of claim 1, wherein the dissolved oxygen concentration is maintained at less than about 0.1 mg/L substantially throughout said cell, tank, pond, or unit.

9. The population of MEAPAOs of claim 1, wherein said cell, tank, pond, or unit contains at least about $10^{17}$ biological microorganisms with a doubling time of about 10 days or less.

10. The population of MEAPAOs of claim 1, wherein said population of MEAPAOs simultaneously nitrifies and denitrifies said organic waste.

11. A population of micro-organisms comprising a population of MEAPAOs characterized in that said MEAPAOs are capable of increased conversion of at least one nutrient from soluble to particulate form in a cell, tank, pond, or unit containing organic waste, without a physically separated and defined anaerobic environment, wherein oxygen is maintained at less than about 2.0 mg/L of dissolved oxygen, and wherein the concentrations of nitrate and nitrite are each less than about 5 mg/L.

12. The population of microorganisms of claim 11, wherein said population of MEAPAOs is comprised of populations of facultative heterotrophic fermentors, autotrophic nitrifiers, heterotrophic facultative denitrifiers, heterotrophic PAOs, heterotrophic MEAPAOs, and autotrophic ammonium denitrifiers.

13. The population of microorganisms of claim 11, wherein said population of MEAPAOs regenerates at a rate of more than about $10^{15}$ base pair replications per second.

14. The population of microorganisms of claim 11, wherein said cell, tank, pond, or unit comprises concentrations of oxygen below about 0.1 mg/L, and nitrate concentrations below about 0.5 mg/L.

15. The population of microorganisms of claim 11, wherein said at least one nutrient is phosphorus.

16. The population of microorganisms of claim 11, wherein said at least one nutrient is nitrogen.

17. The population of microorganisms of claim 11, which further comprises an energy source for the denitrification of nitrite or nitrate by facultative heterotrophic denitrifiers.

18. The population of microorganisms of claim 11, wherein the dissolved oxygen concentration is maintained at less than about 0.1 mg/L substantially throughout said cell, tank, pond, or unit.

19. The population of microorganisms of claim 11, wherein said cell, tank, pond, or unit contains at least about $10^{17}$ biological microorganisms with a doubling time of about 10 days or less.

20. The population of microorganisms of claim 11, wherein said population of MEAPAOs simultaneously nitrifies and denitrifies said organic waste.

* * * * *